US009017196B2

(12) United States Patent
Gunton

(10) Patent No.: US 9,017,196 B2

(45) Date of Patent: Apr. 28, 2015

(54) DRIVE ARRANGEMENT

(76) Inventor: Bruce Stanley Gunton, Yoxall (GB)

(*) Notice: Subject to any disclaimer, the term of this patent is extended or adjusted under 35 U.S.C. 154(b) by 1148 days.

(21) Appl. No.: 12/530,867

(22) PCT Filed: Mar. 28, 2008

(86) PCT No.: PCT/GB2008/001135

§ 371 (c)(1), (2), (4) Date: Sep. 11, 2009

(87) PCT Pub. No.: WO2008/119983

PCT Pub. Date: Oct. 9, 2008

(65) Prior Publication Data

US 2010/0105507 A1 Apr. 29, 2010

(30) Foreign Application Priority Data

| | | |
|---|---|---|
| Mar. 30, 2007 | (GB) | 0706247.4 |
| Aug. 1, 2007 | (GB) | 0714930.5 |
| Jan. 16, 2008 | (GB) | 0800695.9 |

(51) Int. Cl.

| | |
|---|---|
| ***F16H 7/12*** | (2006.01) |
| ***F16H 57/02*** | (2012.01) |
| ***E06B 9/70*** | (2006.01) |
| ***E06B 9/74*** | (2006.01) |

(52) U.S. Cl.

CPC ................ *E06B 9/74* (2013.01); *E05F 15/603* (2015.01); *E05F 15/668* (2015.01); *E05Y 2201/214* (2013.01); *E05Y 2201/244* (2013.01); *E05Y 2201/652* (2013.01); *E05Y 2201/654* (2013.01); *E05Y 2201/66* (2013.01); *E05Y 2201/668* (2013.01); *E05Y 2201/676* (2013.01); *E05Y 2600/10* (2013.01); *E05Y 2900/106* (2013.01); *E06B 9/70* (2013.01); *Y10T 74/2186* (2015.01)

(58) Field of Classification Search

USPC ............ 474/133; 74/606 R, 625; 192/20, 71, 192/224; 160/331; 242/394

See application file for complete search history.

(56) References Cited

U.S. PATENT DOCUMENTS

| | | | | |
|---|---|---|---|---|
| 3,583,250 | A * | 6/1971 | Kongelka | 474/133 |
| 4,502,375 | A | 3/1985 | Hignite et al. | |
| 4,861,321 | A * | 8/1989 | Siegwart, Jr. | 474/133 |
| 5,440,837 | A * | 8/1995 | Piltingsrud | 49/139 |
| 6,810,760 | B2 * | 11/2004 | Sye et al. | 74/405 |
| 7,883,436 | B2 * | 2/2011 | Mosser et al. | 474/135 |
| 8,033,374 | B2 * | 10/2011 | Gunton | 192/224 |
| 2006/0229151 | A1 * | 10/2006 | Jansen et al. | 474/117 |

(Continued)

FOREIGN PATENT DOCUMENTS

| | | | |
|---|---|---|---|
| FR | 1112819 | A | 3/1956 |
| WO | 2005/045170 | A | 5/2005 |

(Continued)

*Primary Examiner* — William E Dondero

*Assistant Examiner* — Robert T Reese

(74) *Attorney, Agent, or Firm* — Chernoff, Vilhauer, McClung & Stenzel, LLP

(57) ABSTRACT

A drive arrangement (10) has first and second wheels (12, 14) and an endless loop member (16). The path of the member (16) is defined in part by a third wheel (18), between the wheels (12, 14). The wheel (18) is movably mounted so that the length can be changed for the path of the member (16) as it passes around the wheel (18), between the wheels (12, -14). Accordingly, the member (16) can be tightened or slackened around the wheels (12, 14), so that the wheels (12, 14) can be coupled to convey drive from one to the other, through the member (16), or disengaged, so that drive is not conveyed.

13 Claims, 20 Drawing Sheets

(56) References Cited

U.S. PATENT DOCUMENTS

| | | | | |
|---|---|---|---|---|
| 2006/0252590 | A1* | 11/2006 | Salomon et al. | 474/117 |
| 2007/0155558 | A1* | 7/2007 | Horst et al. | 474/133 |
| 2007/0155559 | A1* | 7/2007 | Horst et al. | 474/134 |
| 2012/0138244 | A1* | 6/2012 | Tinklepaugh et al. | 160/331 |

FOREIGN PATENT DOCUMENTS

| | | | |
|---|---|---|---|
| WO | 2005/090730 | A | 9/2005 |
| WO | 2007/129059 | A | 11/2007 |

* cited by examiner

DRIVE ARRANGEMENT

This is a national stage application filed under 35 USC 371 based on International Application No. PCT/GB2008/001135 filed Mar. 28, 2008, and claims priority under 35 USC 119 of United Kingdom Patent Application No. 0706247.4 filed Mar. 30, 2007, United Kingdom Patent Application No. 0714930.5 filed Aug. 1, 2007, and United Kingdom Patent Application No. 0800695.9 filed Jan. 16, 2008.

The present invention relates to drive arrangements.

Embodiments of the invention provide a drive arrangement comprising:

first and second rotatable members;

an endless loop member extending around both rotatable members; and a guide member which defines at least part of the path of the loop member;

wherein the guide member is movable to change the length of the path to cause the rotatable members to be engaged or disengaged by the loop member, the loop member serving to disengageably convey drive from one of the rotatable members to the other of the rotatable members when the rotatable members are engaged by the loop member.

The guide member may be rotatably mounted at an axis which is movable relative to the rotatable members. The guide member may be movable generally transverse to the rotation axis thereof, to change the length of the path.

There may be a manual arrangement for setting the position of the guide member. The guide member may be mounted on a pivotally mounted member. There may be means for applying force to cause the pivotally mounted member to pivot. The means for applying force may be a manually extendable or retractable member attached to the pivotally mounted member. The extendable or retractable member may be a Bowden cable having a cable surrounded by a sheath, one of which is fixed to the pivotally mounted member, and the other of which is fixed to a member relative to which the pivotally mounted member is able to pivot. The pivotally mounted member may be a bell crank having a first arm and a second arm, the arms meeting at an elbow, and the bell crank being pivotally mounted at the elbow and carrying the guide member on a first of the arms, there being means for applying force to the other arm to cause the bell crank to turn.

The rotatable members may be wheels having a circumferential groove for receiving the endless loop member. The first and second rotatable members may be mounted on a common support. There may be a motor connected for driving one of the rotatable members. The other rotatable member may be coupled with a shaft for conveying drive from the first rotatable member, through the endless loop member and second rotatable member, to the shaft. The other rotatable member may be coupled with a driven member which is rotatable around a fixed shaft.

The arrangement preferably includes a carriage structure movable relative to one of the rotatable members into and out of driving engagement with the said rotatable member. The carriage structure may carry a toothed member which meshes with a mesh of the rotatable member when the carriage structure and the rotatable member are in driving engagement. The carriage structure preferably includes manually operable drive means for manually driving the rotatable member when the carriage structure and the rotatable member are in driving engagement. The manually operable drive means may comprise a wheel operable to turn by means of an elongate closed loop member, the wheel being coupled with the toothed member of the carriage structure, to cause the rotatable member to be driven when the wheel is turned and the toothed member and the rotatable member are meshed.

There may be a manual arrangement for moving the carriage structure. The manual arrangement may be a Bowden cable extending from the drive arrangement to a remote location and having an inner cable and sheath attached to respective ones of the pivotally mounted member and the carriage structure, whereby forces may be applied between the pivotally mounted member and the carriage structure by manipulation of the Bowden cable at the remote location. Preferably, a force applied between the pivotally mounted member and the carriage structure causes the rotatable members to be engaged by the loop member and disengaged by the toothed member. The sheath may be attached to the pivotally mounted member. The inner cable may be attached to the carriage member. The sheath may be fixedly mounted at the remote location, whereby the loop member may be caused, by manipulation of the inner cable relative to the sheath, to engage and disengage the rotatable members.

In another aspect, the invention provides apparatus comprising:

a support member which, in use, rotatably supports a driven member relative to a fixed structure;

a drive arrangement operable to drive the driven member to rotate; and the drive arrangement being mounted, in use, on the fixed structure by means of the support member, and the support member, in use, bracing the Fdrive arrangement against torque generated by driving the driven member.

The driven arrangement may be in accordance with the first aspect of the invention as set out above.

The drive arrangement may comprise a common support on which the first and second rotatable members are mounted, and wherein the common support couples, in use, with the support member to support the drive arrangement relative to the fixed structure. The common support may releasably couple with the support member. The common support and the support member may interfit at least at one position, the interfitting preventing relative rotation around the rotation axis of the rotatable member. The interfit may be provided by a projection and a complementary surface. The interfit may be provided by at least a pair of projections from a first of the common support and the support member, the pair of projections embracing a portion of the other of the common support and the support member, to prevent relative rotation. The interfit may be provided by at least one projection from the common support.

The said other rotatable member may comprise a feature to engage the driven member to cause both to rotate together around the fixed shaft. The driven member may be a shaft. The driven member may be rotatable around a fixed shaft.

Examples of the invention will now be described in more detail, by way of example only, and with reference to the accompanying drawings, in which.

Figure 1:
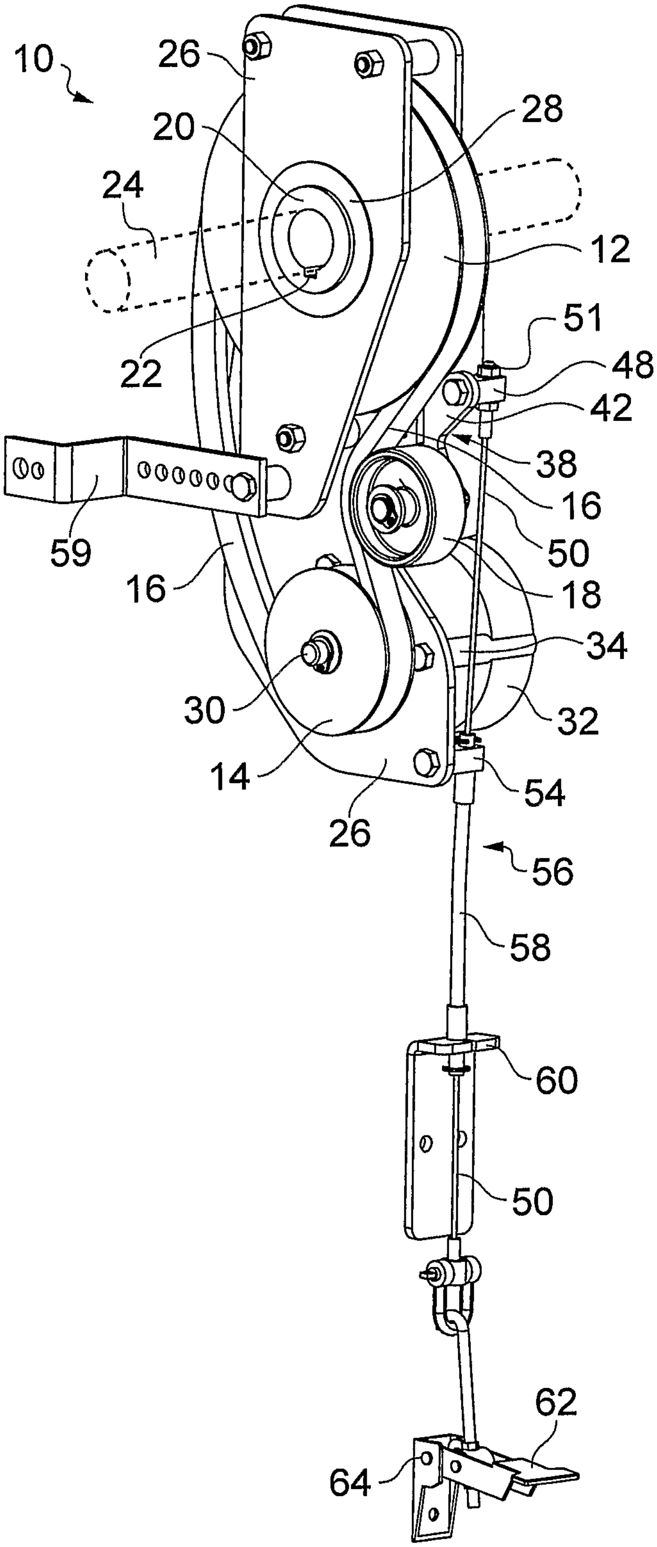
FIGS. 1 and 2 are perspective views of an arrangement of the present invention, viewed from a first angle and showing the drive arrangement respectively in the disengaged and engaged conditions.
Figure 2:
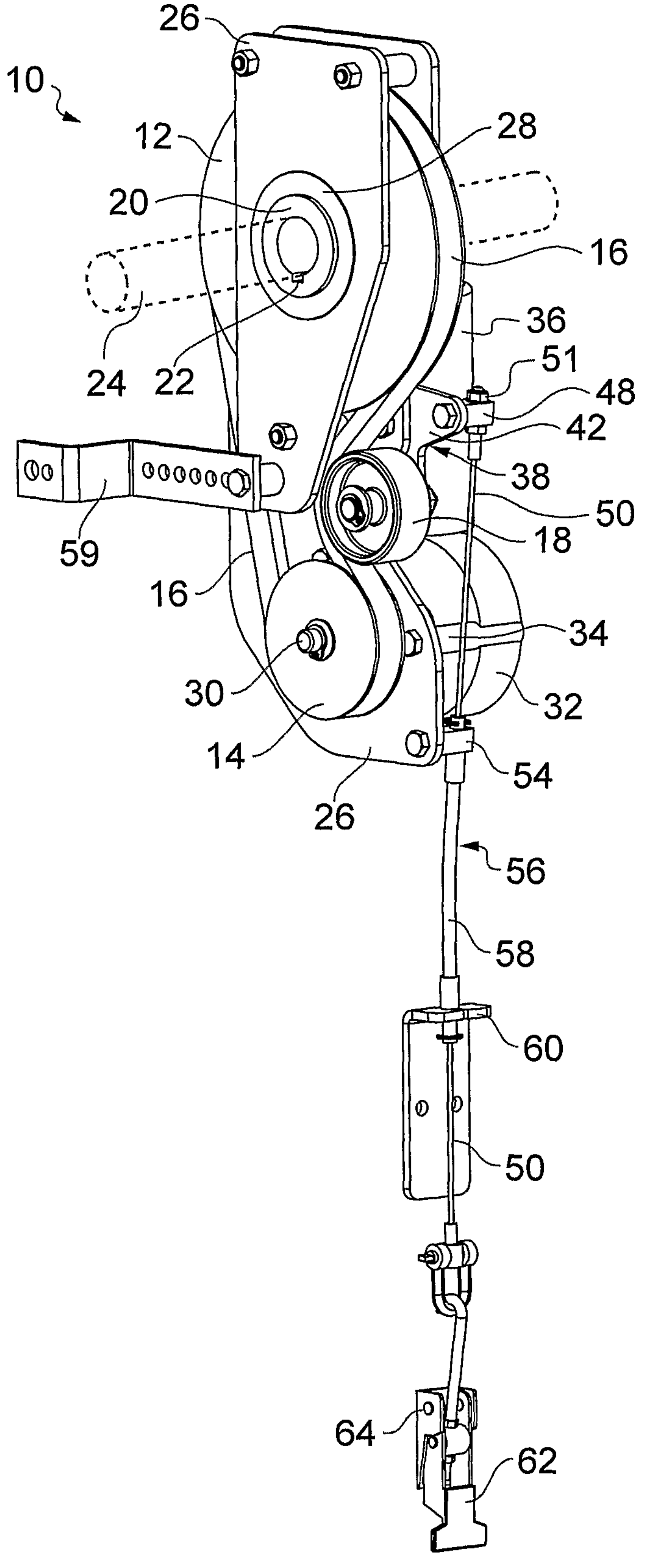
Figure 5:
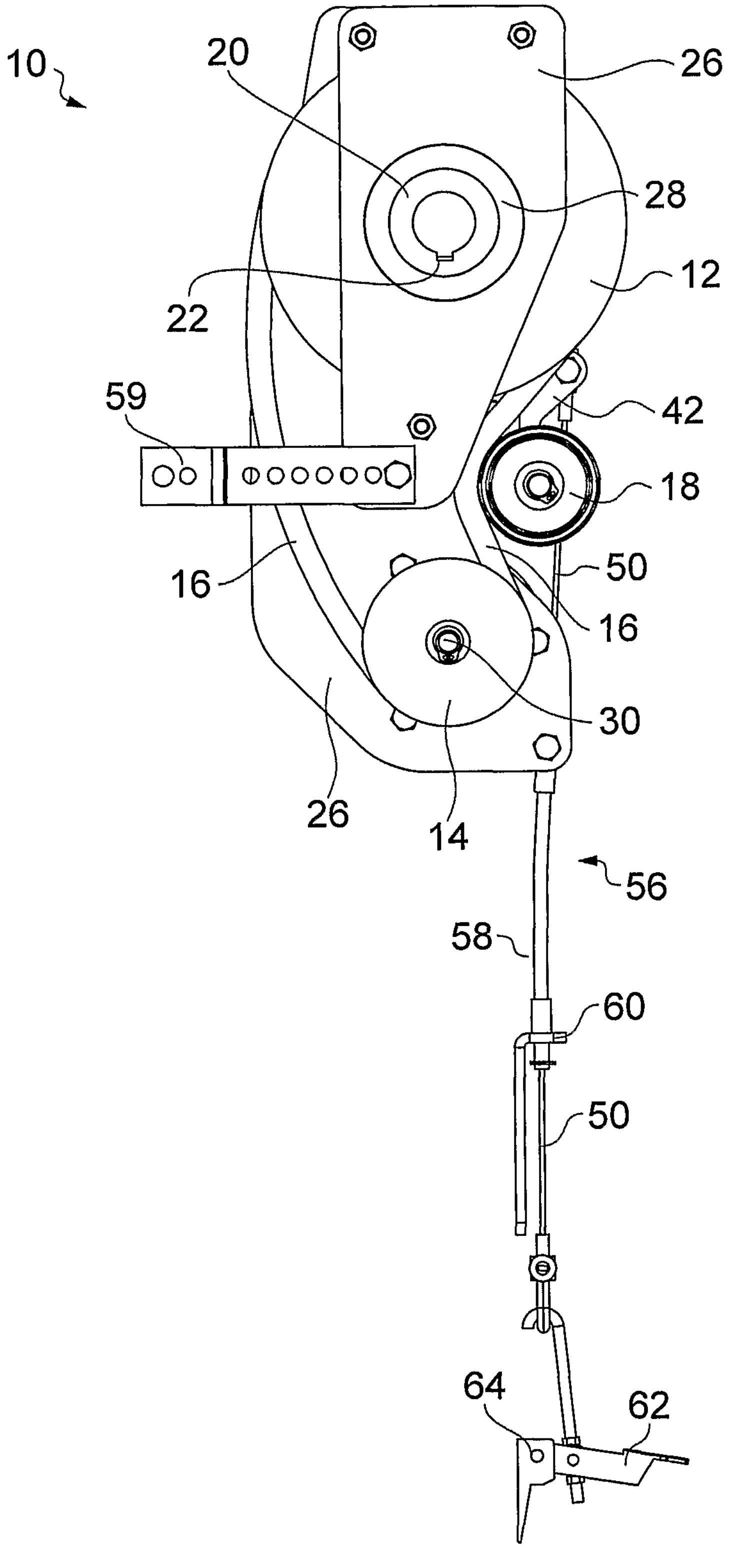
FIGS. 5 and 6 are elevations from a first direction, showing conditions corresponding with FIGS. 1 and 2.
Figure 6:
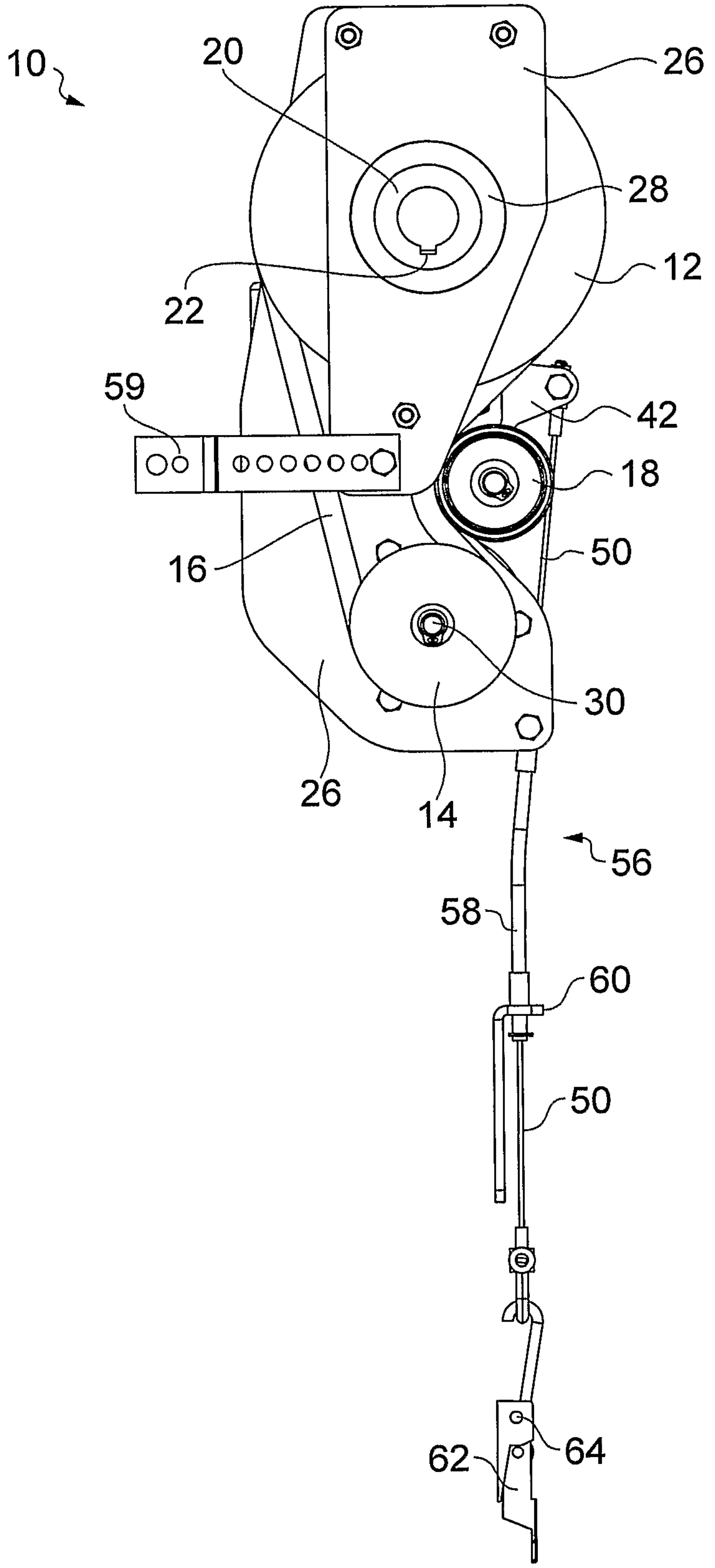
Figure 7:
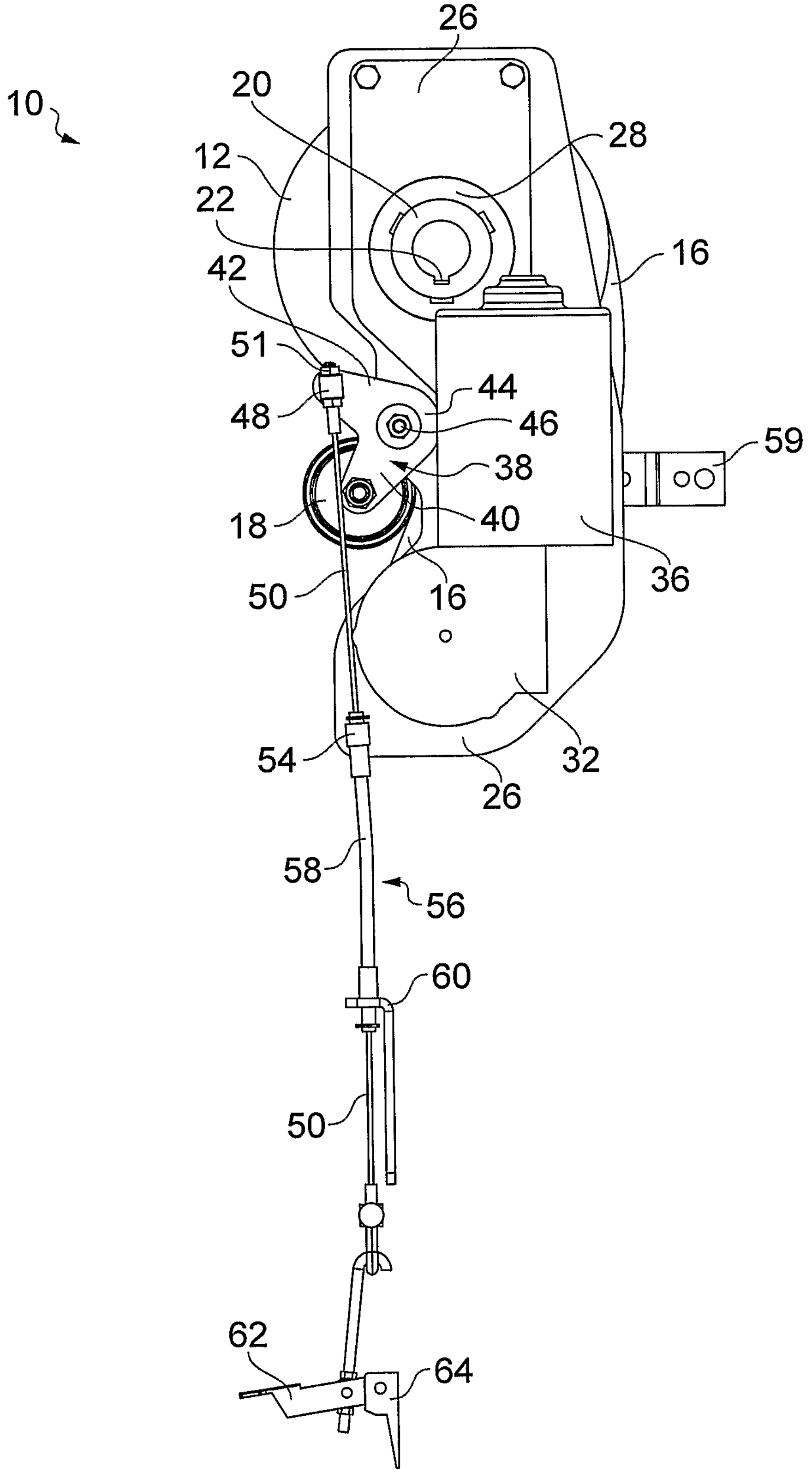
Figure 8:
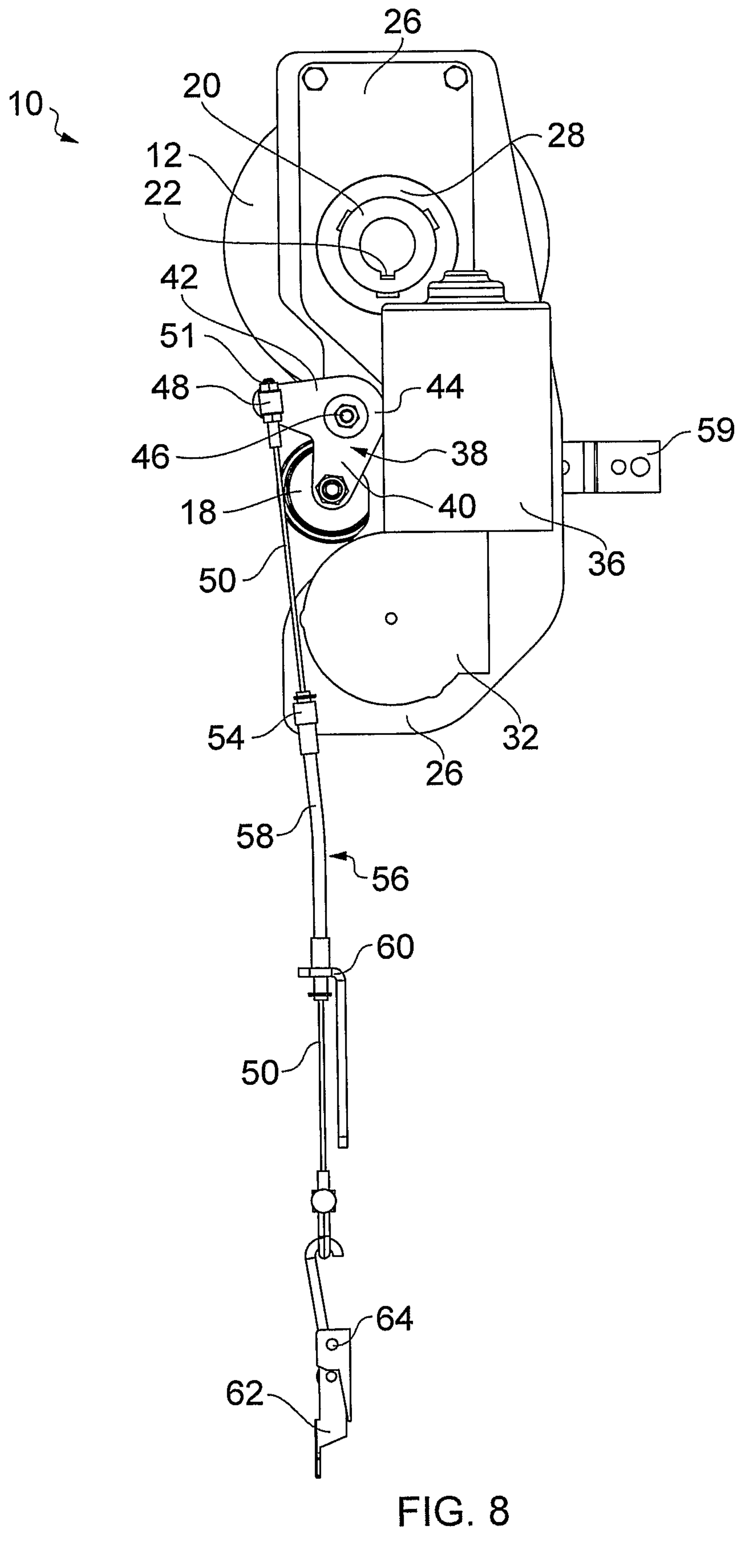
Figure 9:
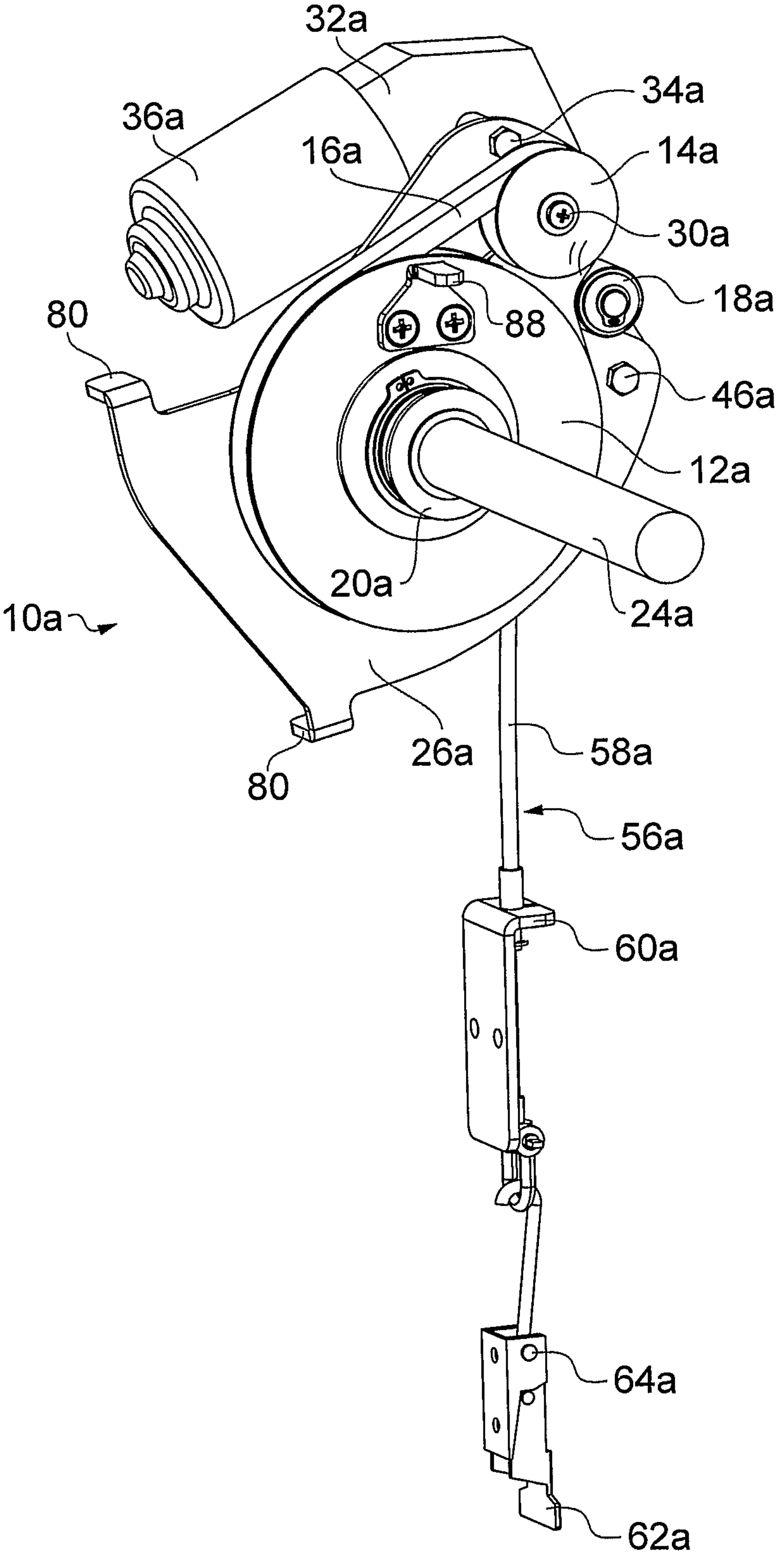
Figure 10:
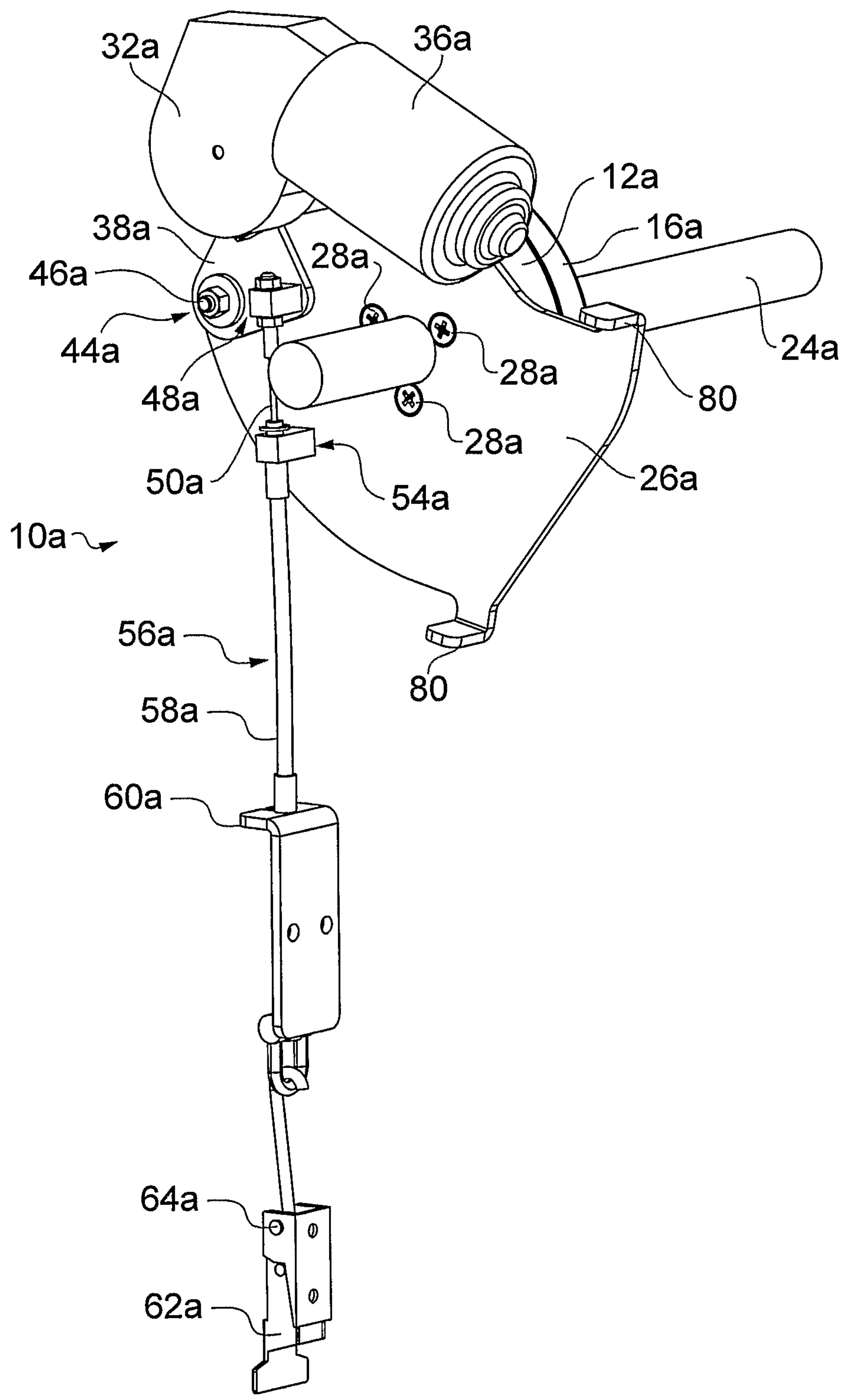
Figure 11:
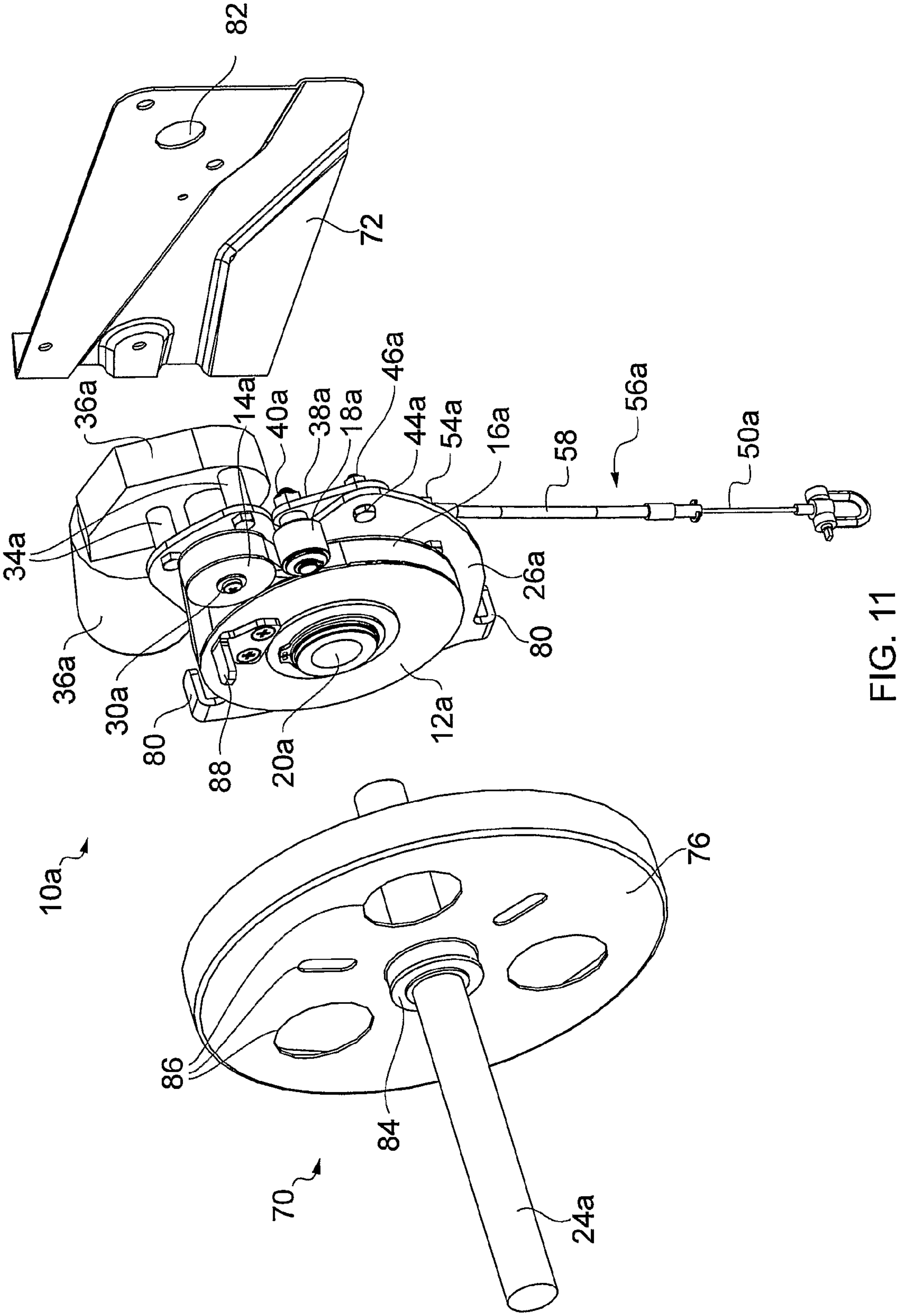
Figure 12:
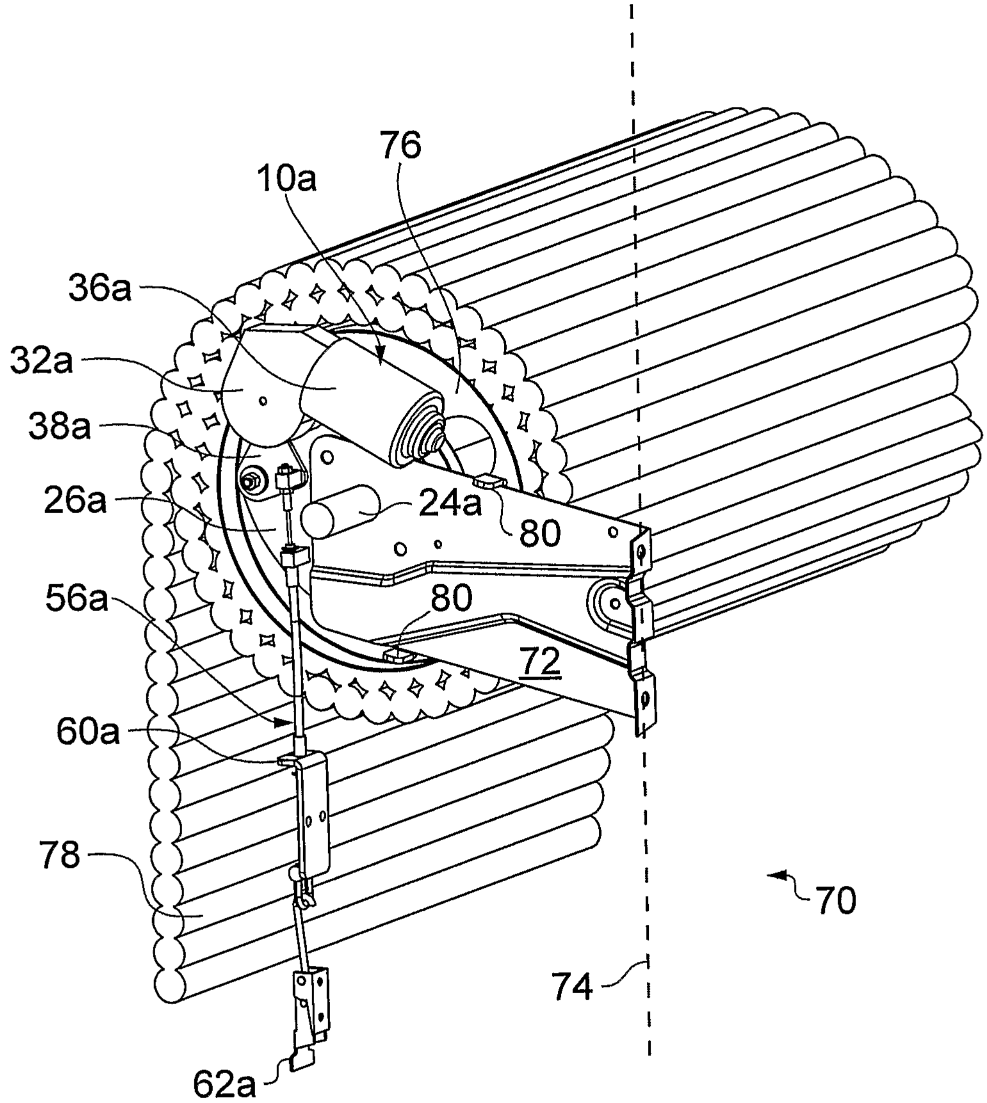
Figure 13:
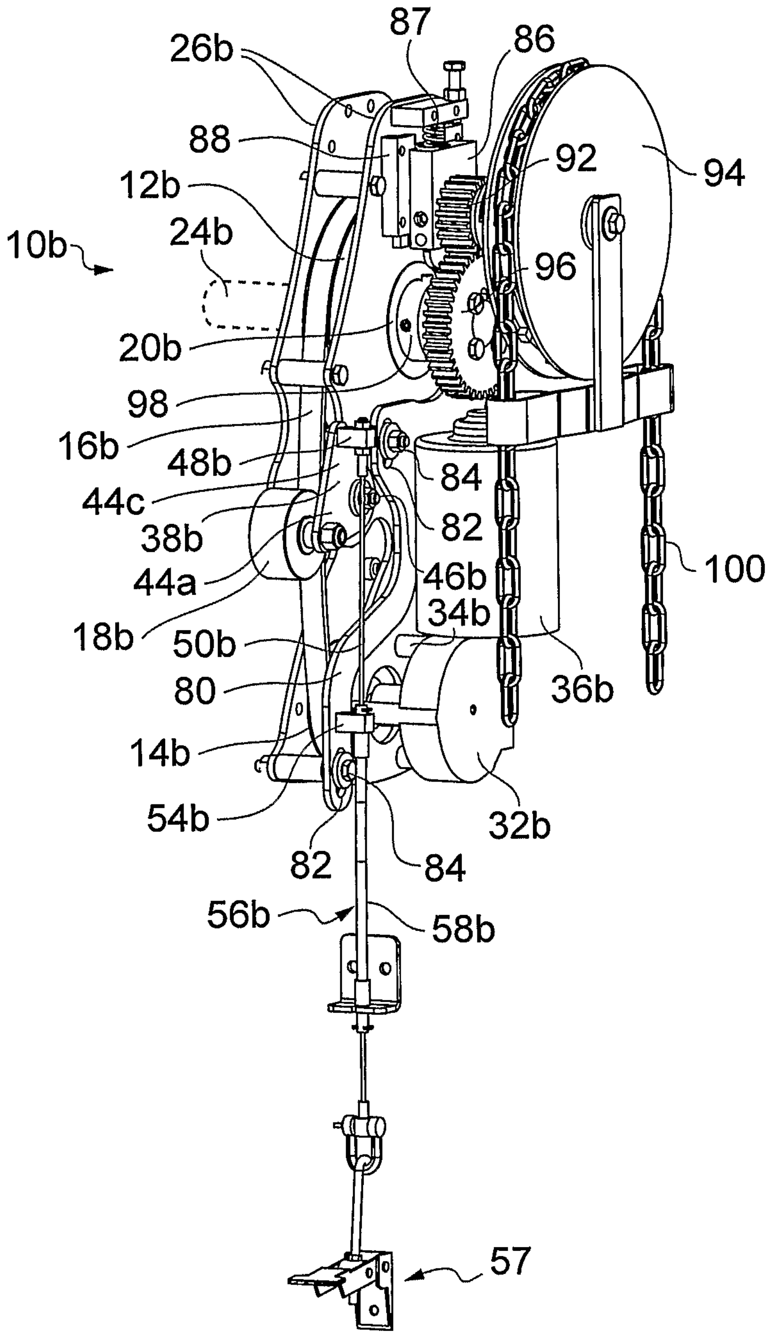
Figure 14:
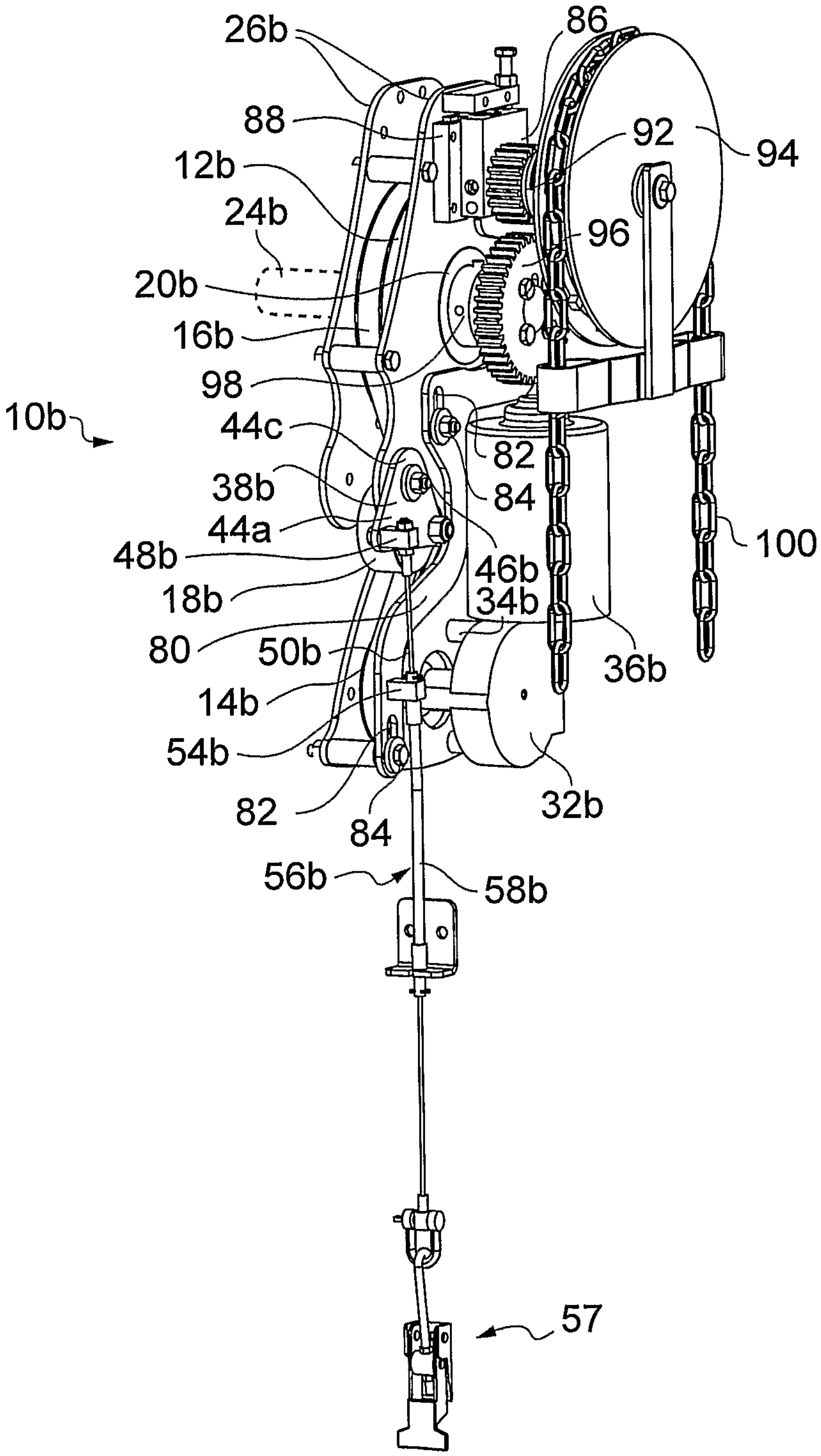
Figure 15:
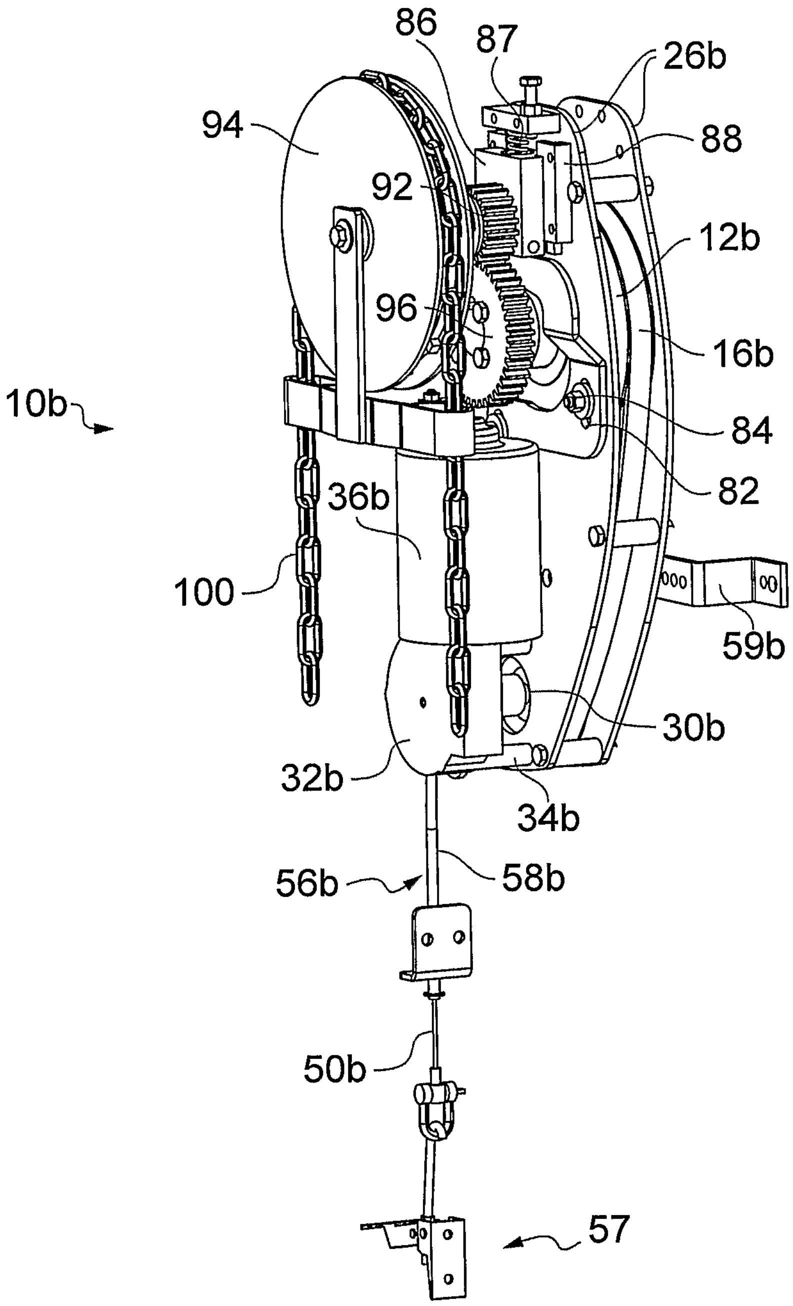
Figure 16:
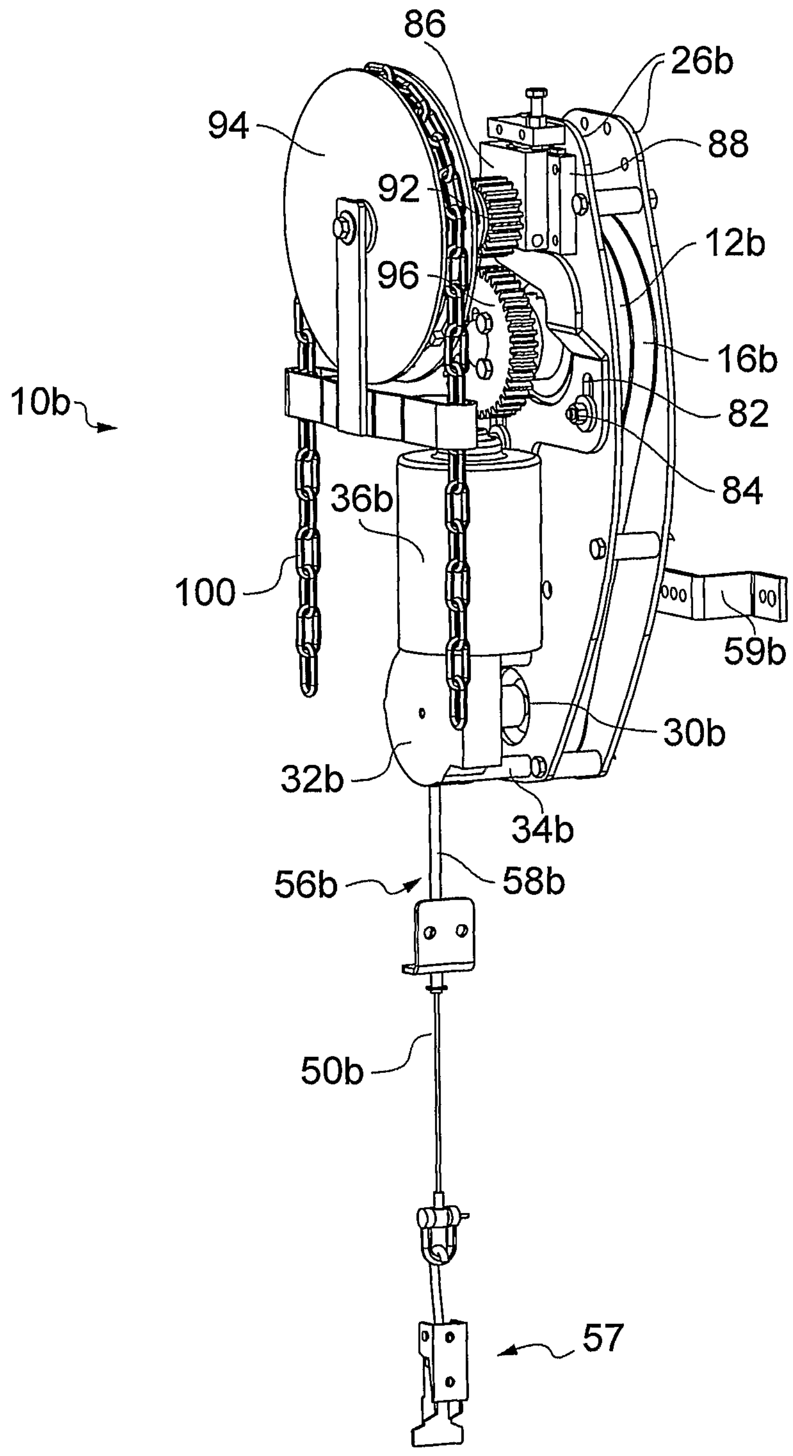
Figure 17:
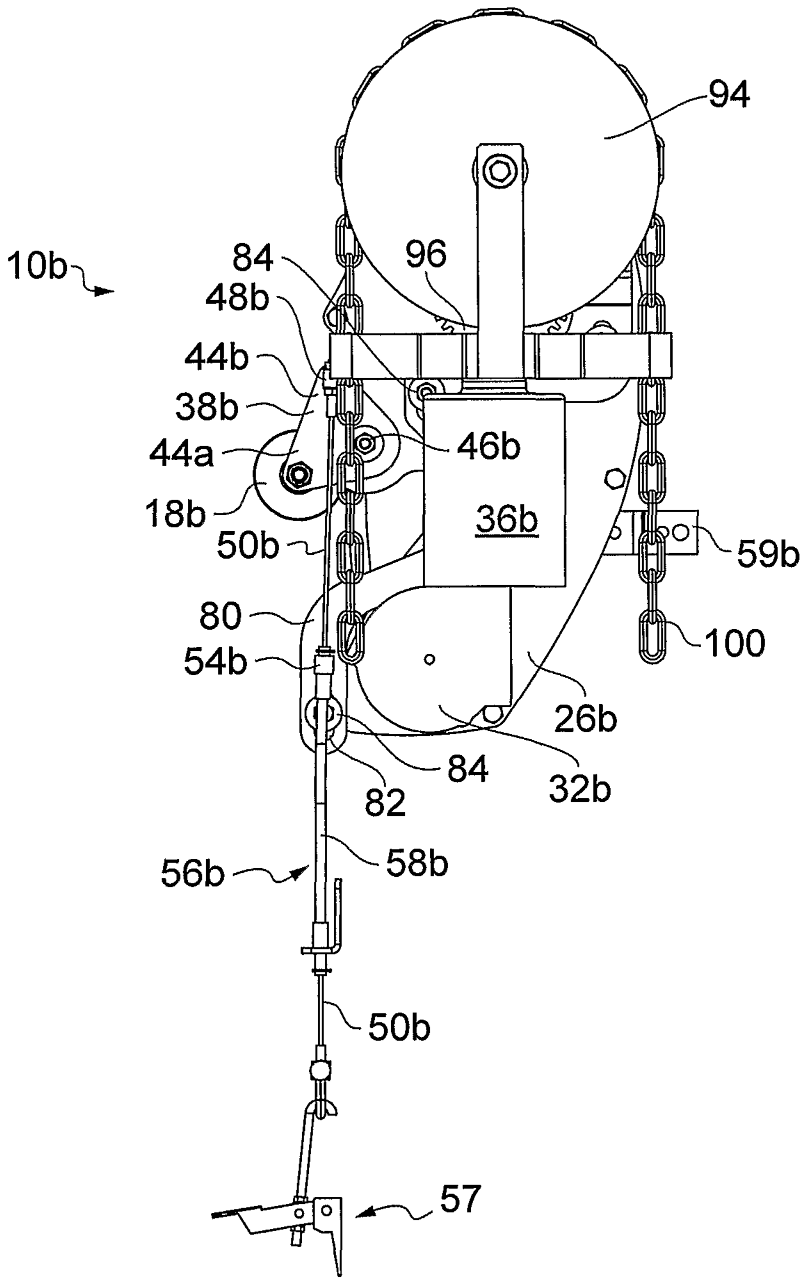
Figure 18:
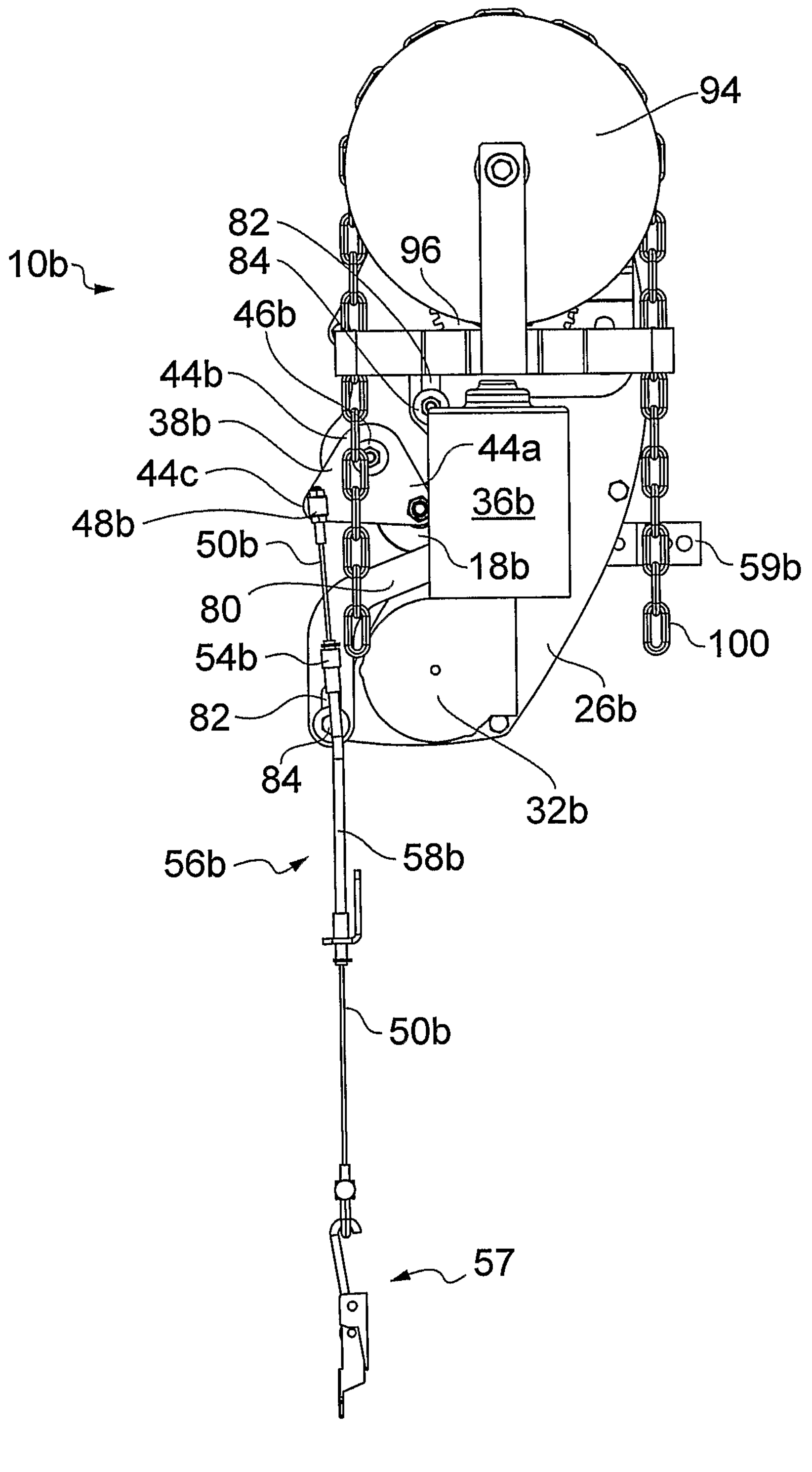
Figure 19:
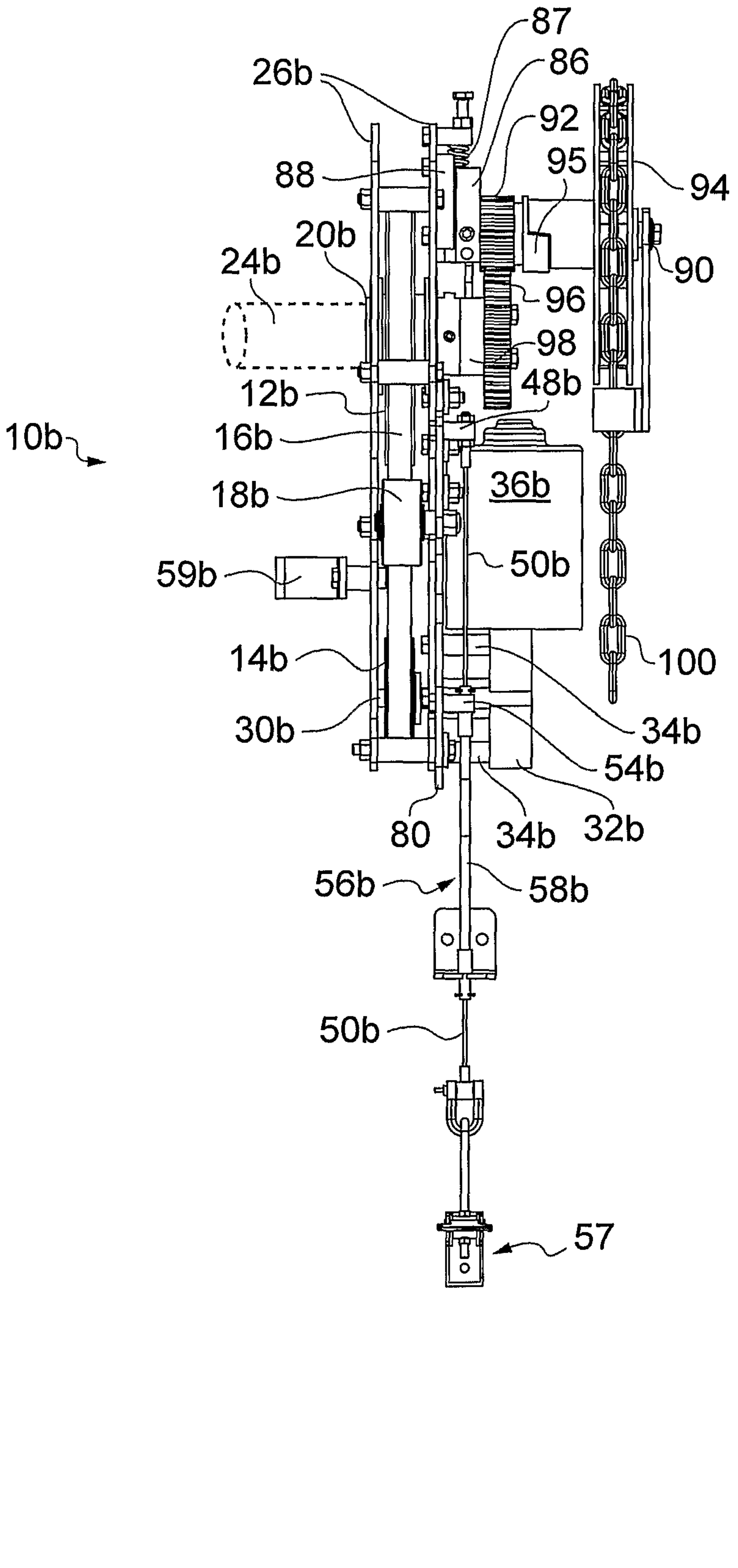
Figure 20:
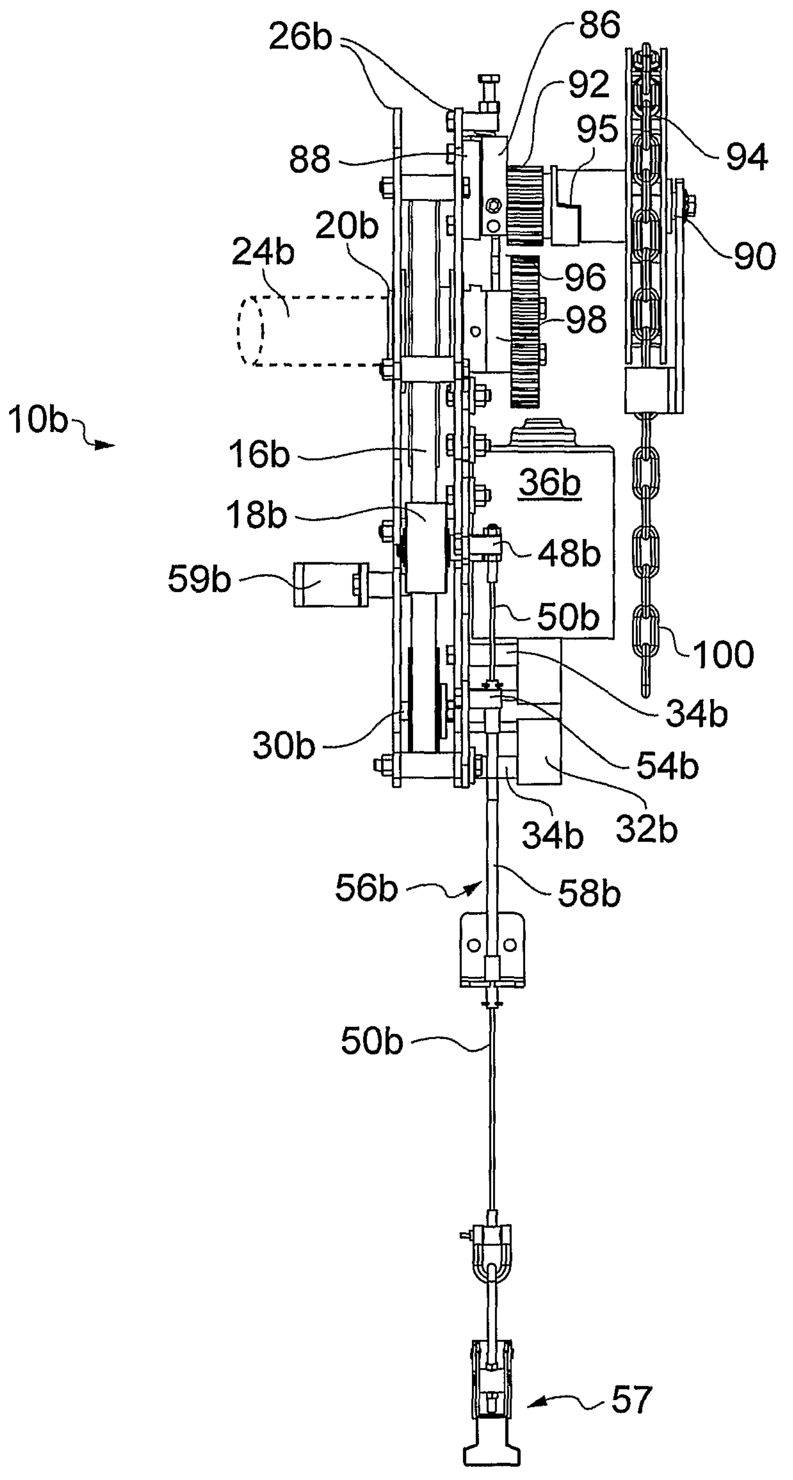

FIGS. 7 and 8 are elevations from the opposite direction to FIGS. 5 and 6, also in conditions corresponding with FIGS. 1 and 2, respectively;

FIGS. 9 and 10 are perspective views of respective faces of an alternative arrangement;

FIG. 11 is a partial and disassembled perspective view of the arrangement of FIGS. 9 and 10;

FIG. 12 is a perspective view of the arrangement of FIGS. 9 to 11, in use;

FIGS. 13 and 14 are perspective views of another example, respectively disengaged and engaged;

FIGS. 15 and 16 correspond with FIGS. 13 and 14, viewed in the generally opposite direction;

FIGS. 17 and 18 are side elevations corresponding with FIGS. 13 and 14; and FIGS. 19 and 20 are front elevations corresponding with FIGS. 13 and 14.

FIG. 1 illustrates a first example of a drive arrangement 10. The arrangement 10 comprises first and second rotatable members 12, 14. An endless loop member 16 extends around both rotatable members 12, 14. The rotatable members 12, 14 are pulley wheels, in this example, having circumferential grooves for receiving the endless loop member 16, which may be a belt of natural or synthetic rubber, or other synthetic material, wire or chain. The path of the member 16 is defined in part by a guide member in the form of a third wheel 18. The wheel 18 is interposed between the wheels 12, 14, to prevent the member 16 adopting a straight configuration from one wheel 12, 14 to the other wheel 12, 14. Thus, the wheels 12, 14, 18 are aligned substantially in the same plane, with substantially parallel rotation axes, and the path of the member 16 must pass around the wheel 18, between the wheels 12, 14.

The wheel 12 is provided with a hub 20. In this example, the hub 20 has a slot 22 for keying the hub 20 (and thus the wheel 12) to a shaft 24 indicated in broken lines in FIGS. 1 and 2. The hub 20 is mounted on plates 26 by means of appropriate bearings indicated generally at 28. Accordingly, the wheel 12 is rotatably mounted on the plates 26, and able to rotate a shaft 24 to which the hub 20 is keyed by means of the slot 22.

The wheel 14 is mounted on a shaft 30, to turn with the shaft 30. The shaft 30 is the output shaft of a gearbox 32 secured to the plates 26 by means of mounts 34. Drive to the gearbox 32 is provided, in use, by a motor 36, which may be an electric motor. Accordingly, the electric motor 36 can drive the wheel 14, through the gearbox 32. The wheel 14 is fixed with the gearbox, relative to the plate 26, by virtue of the mounts 34.

The wheel 18 is rotatably mounted on a bell crank 38 at one end of a first arm 40. The first arm 40 meets a second arm 42 at an elbow 44. The bell crank 38 is pivotally mounted to the plates 26 at the elbow 44, indicated by a nut and bolt arrangement 46. The free end of the second arm 42 carries a fixing 48 to which a cable 50 can be secured. The fixing 48 may consist of a block attached to the arm 42 and having an eye for receiving the cable 50, and a screw arrangement 51 for clamping onto a cable 50 received within the eye.

A second fixing 54, similar to the fixing 48, is provided on the plates 26, at a position away from the bell crank 38.

In this example, the cable 50 is the inner cable of a Bowden cable 56. The cable 50 is covered by a sheath 58. The sheath is fixed in the eye of the fixing 54. Accordingly, the sheath 58 is fixed in position, relative to the plate 26, by the fixing 54. The cable 50 is fixed to the second arm 42, by means of the fixing 48. Accordingly, manipulation of the Bowden cable 56, at the end remote from the plates 26, allows the fixing 48 to be pulled toward, or released to move away from the fixing 54. As this force is applied or released, the bell crank 38 is urged to swing about the elbow 44, relative to the plate 26.

The Bowden cable 56 thus provides a manual arrangement for setting the position of the bell crank 38.

The significance of the action of the Bowden cable 56, and rotation of the bell crank 38 can now be described. In the condition shown in each of FIGS. 1, 3, 5 and 7, the Bowden cable 56 has been released, allowing the cable 50 to run through the sheath 58. The fixing 54 is free to move away from the fixing 48. As it does so, the first arm 40 carries the wheel 18 generally transversely away from the loop member 16.

In the alternative position of FIGS. 2, 4, 6 and 8, the Bowden cable 56 has been manipulated to pull the fixing 54 toward the fixing 48, so that the bell crank 38 swings in the other direction, moving the wheel 18 transversely toward the loop member 16.

Comparison of FIGS. 1 and 2, or FIGS. 3 and 4, or FIGS. 5 and 6, or FIGS. 7 and 8, shows that as the wheel 18 moves to the position of FIGS. 2, 4, 6 and 8, the path of the loop member 16 is required to deflect, to a greater amount, in order to pass around the wheel 18. The length of the leg of the loop member 16, between the wheel 12 and 14 and around the wheel 18, is changed by the position of the wheel 18. The change in the length of the path of the loop member 16, caused by movement of the wheel 18, will change the tension in the loop member 16 and will thus change how tightly the loop member 16 grips around the wheels 12, 14.

In the condition of FIGS. 1, 3, 5 and 7, the wheel 18 has moved to a position which results in a relatively short complete path for the loop member 16, which is therefore slack (as clearly visible from the left hand side of FIG. 1). In this condition, the wheels 12, 14 are not gripped tightly by the loop member 16. The wheel 14 is unable to drive the loop member 16 in the event that the motor 36 is driving the wheel 14. The wheel 12 is not coupled to the wheel 14. The loop member 16 is disabled from driving the wheel 12 and consequently, the shaft 24 cannot be driven by the motor 36.

In the alternative position of FIGS. 2, 4, 6 and 8, the overall path length of the loop member 16 is longer, by virtue of the position of the wheel 18. This requires the loop member 16 to deflect to a greater degree. Accordingly, the loop member 16 grips both wheels 12, 14 more tightly. This results in driving engagement between the wheel 12 and the loop member 16 and also between the loop member 16 and the wheel 14. In this condition, the motor 36 can be used to drive the wheel 14, which is coupled by the tightened loop member 16 to drive the wheel 12. Thus the shaft 24, to which the wheel 12 is secured, also driven by the action of the motor 36. This will create torque tending to turn the arrangement 10 around the shaft 24. The arrangement 10 is braced against this torque by a torque arm 59 fixed between the plates 26 and a fixed structure (not shown).

The movement of the wheel 18, to change the overall length of the path of the loop member 16, causes the wheels 12, 14 to be engaged or disengaged by the loop member 16, so that the loop member 16 will disengageably drive the wheel 12 from the wheel 14.

Figure 3:
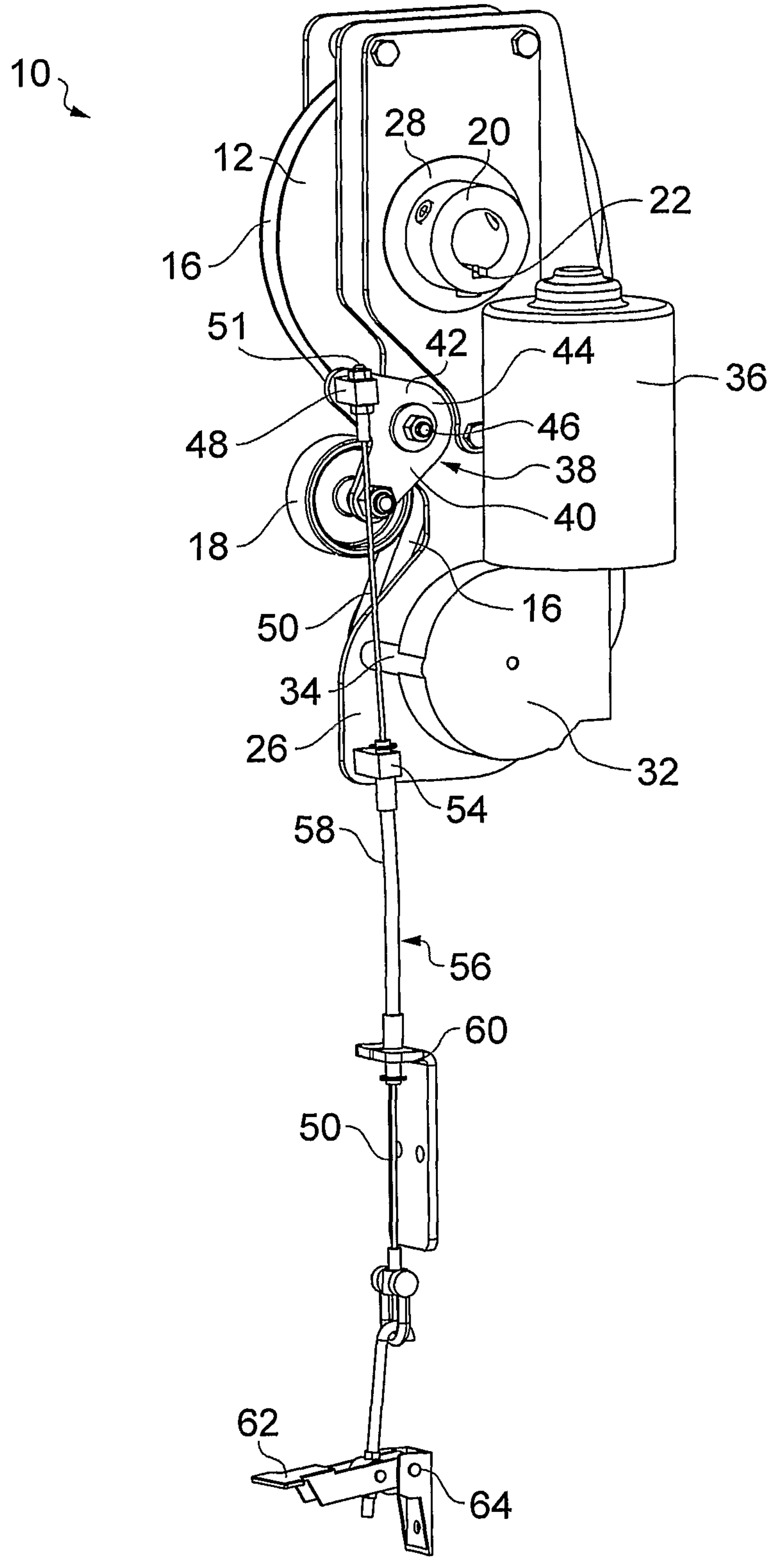
FIGS. 3 and 4 are reverse angle views corresponding with FIGS. 1 and 2, respectively.
Figure 4:
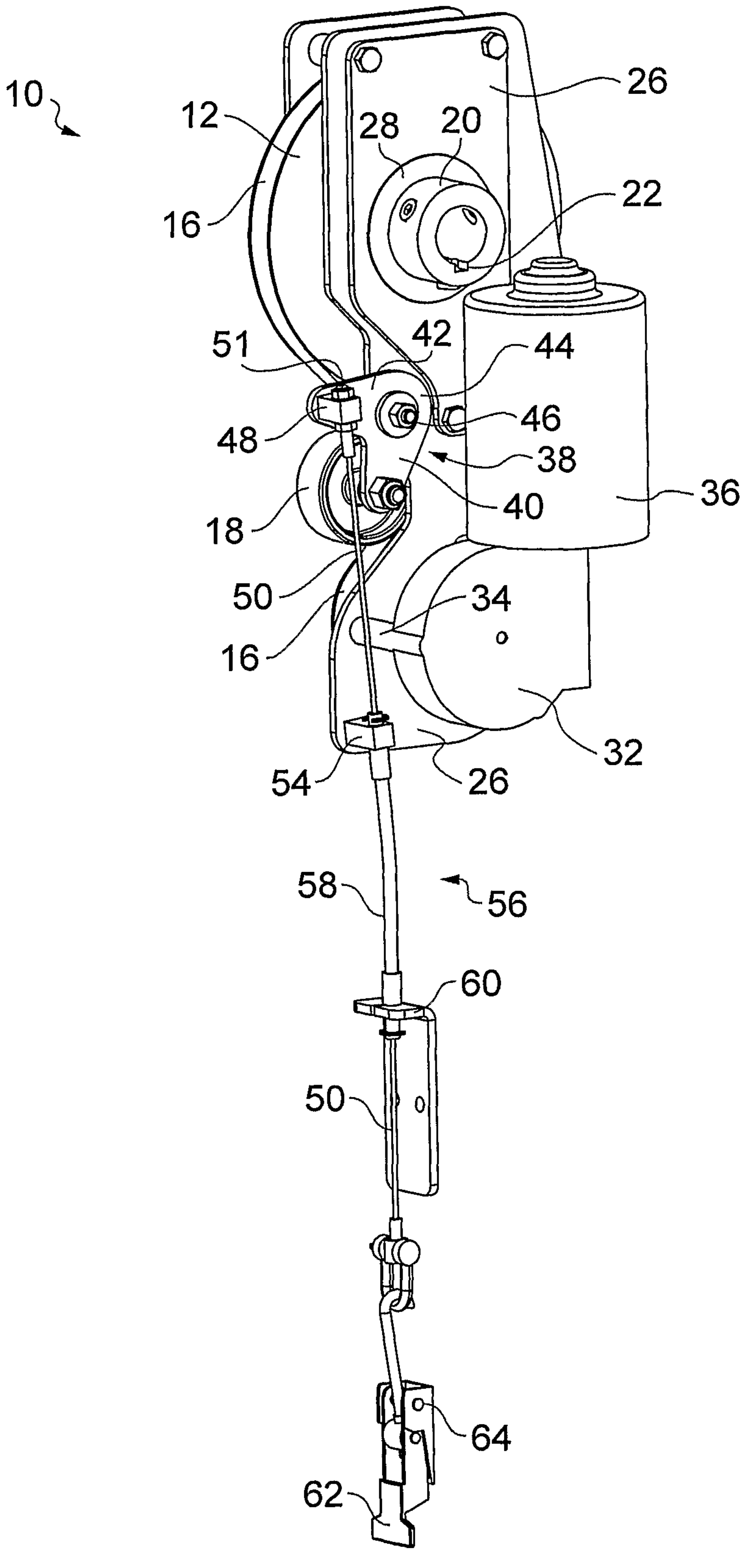

FIG. 3 illustrates, in simple schematic manner, an arrangement for controlling the Bowden cable 56 from a position remote from the plates 26, in order to engage or disengage the drive between the wheels 12, 14. The sheath 58 of the Bowden cable 56 is held at 60 by a further fixing. The cable 50 is attached to a lever 62, pivoted at 64. Manipulation of the lever 62 allows the cable 50 to be pulled or released, while leaving the sheath 58 fixed at 60 (and at 54). The result is to allow the lever 62 to be used to pull the first arm 40 of the bell crank 38 by means of the cable 50. The lever 62 can be pulled until the guide wheel 18 has tightened the loop member 16 sufficiently to engage both wheels 12, 14. Alternatively, the lever 62 may be manipulated to slacken the cable 50, so that drive to the wheel 12 (and thus to the shaft 24) is disabled.

The shaft 24 may be the shaft of a sectional door, roller shutter door or the like, typically mounted at the top of the aperture closed by the door. An arrangement of this nature is typical for automatic garage doors. The arrangements described above allow the garage door to be disengaged from the motor 36. This is achieved by releasing the Bowden cable 56 in a manual manner and from a remote location, by manipulation of the lever 62. Once the motor 36 has been disengaged from the door, the door may be opened by hand. This may be advantageous, for example, during a power failure or other malfunction.

FIGS. 9 to 12 illustrate a second example of a drive arrangement 10*a*. Many features of the arrangement 10*a* are the same as, or closely correspond with features of the arrangement 10 of FIGS. 1 to 8, and the same reference numerals are therefore used, with the suffix "a".

The arrangement 10*a* comprises first and second rotatable members 12*a*, 14*a*. An endless loop member 16*a* extends around both rotatable members 12*a*, 14*a*. The rotatable members 12*a*, 14*a* are pulley wheels, in this example, having circumferential grooves for receiving the endless loop member 16*a*, which may be a belt of natural or synthetic rubber, or other synthetic material, wire or chain. The path of the member 16*a* is defined in part by a guide member in the form of a third wheel 18*a*. The wheel 18*a* is interposed between the wheels 12*a*, 14*a*, to prevent the member 16*a* adopting a straight configuration from one wheel 12*a*, 14*a* to the other wheel 12*a*, 14*a*. Thus, the wheels 12*a*, 14*a*, 18*a* are aligned substantially in the same plane, with substantially parallel rotation axes, and the path of the member 16*a* must pass around the wheel 18*a*, between the wheels 12*a*, 14*a*.

The wheel 12*a* is provided with a hub 20*a*. In this example, the hub 20*a* includes bearings to allow the wheel 12*a* to rotate relative to a fixed shaft 24*a*. The hub 20*a* is mounted on a common support plate 26*a* by means of appropriate fixings indicated generally at 28*a*. Accordingly, the wheel 12*a* is rotatably mounted on the plates 26*a*, and able to rotate around the shaft 24*a*.

The wheel 14*a* is mounted on a shaft 30*a*, to turn with the shaft 30*a*. The shaft 30*a* is the output shaft of a gearbox 32*a* secured to the plate 26*a* by means of a mount 34*a*. Drive to the gearbox 32*a* is provided, in use, by a motor 36*a*, which may be an electric motor. Accordingly, the electric motor 36*a* can drive the wheel 14*a*, through the gearbox 32*a*. The wheel 14*a* is fixed with the gearbox, relative to the plate 26*a*, by virtue of the mounts 34*a*.

The wheel 18*a* is rotatably mounted on a lever plate 38*a* at a position 40*a*. The lever plate 38*a* is pivotally mounted to the plate 26*a* at a second position 44*a*, by a nut and bolt arrangement 46*a*. The plate 38*a* also carries a fixing 48*a* to which a cable 50*a* can be secured. The fixing 48*a* may consist of a block attached to the plate 38*a* and having an eye for receiving the cable 50*a*, and a screw arrangement for clamping onto a cable 50*a* received within the eye.

A second fixing 54*a*, similar to the fixing 48*a*, is provided on the plate 26*a*, at a position away from the lever plate 38*a*.

In this example, the cable 50*a* is the inner cable of a Bowden cable 56*a*. The cable 50*a* is covered by a sheath 58*a*. The sheath is fixed in the eye of the fixing 54*a*. Accordingly, the sheath 58*a* is fixed in position, relative to the plate 26*a*, by the fixing 54*a*. The cable 50*a* is fixed to the lever plate 38*a*, by means of the fixing 48*a*. Accordingly, manipulation of the Bowden cable 56*a*, at the end remote from the plate 26*a*, allows the fixing 48*a* to be pulled toward, or released to move away from the fixing 54*a*. As this force is applied or released, the lever plate 38*a* is urged to swing about the position 44*a*, relative to the plate 26*a*.

The Bowden cable 56*a* thus provides a manual arrangement for setting the position of the lever plate 38*a*.

The action of the Bowden cable 56*a* is equivalent to the action described above, in relation to FIGS. 1 to 8. When the Bowden cable 56*a* has been released, the cable 50*a* may run through the sheath 58*a*. The fixing 54*a* is free to move away from the fixing 48*a*. As it does so, the lever plate 38*a* carries the wheel 18*a* generally transversely away from the loop member 16*a*. The loop member 16*a* becomes slack and the wheels 12*a*, 14*a* cease to be coupled.

Alternatively, the Bowden cable 56*a* may be manipulated to pull the fixing 54*a* toward the fixing 48*a*, so that the lever plate 38*a* swings in the other direction, moving the wheel 18*a* transversely toward the loop member 16*a*. This tightens the loop member 16*a*, so that the wheel 12*a* can be driven by rotation of the wheel 14*a*.

As described above, in relation to FIG. 3, the Bowden cable 56*a* may be controlled from a position remote from the plate 26*a*, in order to engage or disengage the drive between the wheels 12*a*, 14*a*. The sheath 58*a* of the Bowden cable 56*a* is held at 60*a* by a further fixing. The cable 50*a* is attached to a lever 62*a*, pivoted at 64*a*. Manipulation of the lever 62*a* allows the cable 50*a* to be pulled or released, while leaving the sheath 58*a* fixed at 60*a* (and at 54*a*). The result is to allow the lever 62*a* to be used to pull the lever plate 38*a* by means of the cable 50*a*. The lever 62*a* can be pulled until the guide wheel 18*a* has tightened the loop member 16*a* sufficiently to engage both wheels 12*a*, 14*a*. Alternatively, the lever 62*a* may be manipulated to slacken the cable 50*a*, so that drive to the wheel 12*a* is disabled.

The shaft 24*a* may be the shaft of a sectional door, roller shutter door or the like, typically mounted at the top of the aperture closed by the door. An arrangement of this nature is typical for automatic garage doors and an example installation is partially illustrated in FIG. 12. The apparatus 70 of FIG. 12, comprises a shaft 24*a* supported by a support member or bracket 72 relative to a fixed structure 74, such as a wall adjacent the aperture in which the apparatus 70 is mounted. The shaft 24*a* is fixed against rotation relative to the bracket 72 and carries a rotatable drum 76. Rotation of the drum 76 causes the door 78 to be reeled in or out. The drive arrangement previously described in relation to FIGS. 9 to 11 is mounted, in use, on the fixed structure 74, by means of the bracket 72, in a manner which will be described in more detail below. When so mounted, the drive arrangement 10*a* is operable to drive the drum 76 to rotate about the shaft 24*a*. As it does so, torque will be created, tending to turn the drive arrangement 10*a* around the shaft 24*a*. The bracket 72 braces the drive arrangement 10*a* against this torque, as can now be described.

Returning first to FIGS. 9 and 10, it can be seen that the common support plate 26*a*, on which the wheels 12*a*, 14*a* are mounted, is generally planar, but comprises two projections 80, in the form of small lugs. When the apparatus 70 is assembled from the disassembled condition of FIG. 11 (in which the door 78 and fixed structure 74 are omitted, for clarity), the shaft 24*a* is passed through the hub 20*a* and fixed in an aperture 82 in the bracket 72. This fixes the shaft 24*a* against rotation relative to the bracket 72 (and thus relative to the fixed structure 74), but the drum 76 remains able to rotate around the fixed shaft 30*a*, by means of bearings 84. In an alternative, the drum 76 may be fixed to the shaft 24*a*, which is rotatably mounted on the bracket 72.

The drum 76 has various apertures 86. The wheel 12*a* carries a finger 88. As the assembly comes together, the finger 88 enters one of the apertures 86, keying the drum 76 to the wheel 12*a* so that they will rotate together about the shaft 24*a*. Thus, drive to the wheel 12*a* is conveyed to the drum 76.

Further as the assembly is formed, the plate 26*a* approaches the bracket 72, with these two elements generally parallel with each other, until they abut. As they do so, the projections 80 reach over the top and bottom edges (when oriented as illustrated in FIG. 11) of the bracket 72. Thus, an interfit is created between the plate 26*a* and the bracket 72, by means of the projections 80 embracing the bracket 72 and each engaging a complementary surface of the bracket 72. The embrace provided by the projections 80 prevents the drive arrangement 10*a* from turning around the shaft 24*a* in response to torque created when the drum 76 is driven by the wheel 12*a*.

The plate 26*a* acts as a common support for the various components of the arrangement 10*a*, which therefore forms a module mounted on the bracket 72 in a simple manner. The interfitting arrangement of the plate 26*a* and the bracket 72 provides other advantages, in addition to the function of bracing the drive arrangement 10*a* against torque. The interfitting facilitates installation, as follows. Once the bracket 72 has been fixed to the structure 74, nothing further is fixed to the fixed structure 74. The plate 26 is interfitted with the bracket 72, and the shaft 24*a* is fixed to the bracket 72 in the aperture 82. Thus, bracing against torque is provided in a simple and predictable manner by interfitting of the plate 26*a* and the bracket 72. This can be achieved without variation being required by the local conditions, since the interfitting occurs within the apparatus 70. A torque limb from the drive arrangement 10*a* to the fixed structure 74 is not required.

The arrangement described above, in relation to FIG. 12, allows the door 78 to be driven by the motor 36*a*, or to be disengaged from the motor 36*a*. This is achieved by releasing the Bowden cable 56 in a manual manner and from a remote location, by manipulation of the lever 62. Once the motor 36 has been disengaged from the door, the door may be opened by hand. This may be advantageous, for example, during a power failure or other malfunction.

FIGS. 13 to 20 illustrate a further example of a drive arrangement 10*b*. The arrangement 10*b* comprises first and second rotatable members 12*b*, 14*b*. An endless loop member 16*b* extends around both rotatable members 12*b*, 14*b*. The rotatable members 12*b*, 14*b* are pulley wheels, in this example, having circumferential grooves for receiving the endless loop member 16*b*, which may be a belt of natural or synthetic rubber, or other synthetic material, wire or chain. The path of the member 16*b* is defined in part by a guide member in the form of a third wheel 18*b*. The wheel 18*b* is interposed between the wheels 12*b* and 14*b*. The wheels 12*b*, 14*b*, 18*b* are aligned substantially in the same plane, with substantially parallel rotation axes, and the path of the member 16*b* must pass the wheel 18*b*, between the wheels 12*b*, 14*b*.

The wheel 12*b* is provided with a hub 20*b*. In this example, the hub 20*b* (and thus the wheel 12*b*) is keyed to a shaft 24*b* indicated in broken lines in FIGS. 13, 14, 19 and 20. The hub 20*b* is mounted on plates 26*b* by means of appropriate bearings (not visible). Accordingly, the wheel 12*b* is rotatably mounted on the plates 26*b*, and able to rotate a shaft 24*b* to which the hub 20*b* is keyed.

The wheel 14*b* is mounted on a shaft 30*b* (see particularly FIGS. 19 and 20), to turn with the shaft 30*b*. The shaft 30*b* is the output shaft of a gearbox 32*b* secured to the plates 26*b* by means of mounts 34*b*. Drive to the gearbox 32*b* is provided, in use, by a motor 36*b*, which may be an electric motor. Accordingly, the electric motor 36*b* can drive the wheel 14*b*, through the gearbox 32*b*. The wheel 14*b* is fixed with the gearbox, relative to the plate 26*b*, by virtue of the mounts 34*b*.

The wheel 18*b* is rotatably mounted on a triangle 38*b* at one corner 44*a* of the triangle 38*b*. The triangle 38*b* is pivotally mounted to the plates 26*b* at the corner 44*b*, indicated by a nut and bolt arrangement 46*b*. The third corner 44*c* of the triangle 38*b* carries a fixing 48*b* to which a cable 50*b* can be secured. The fixing 48*b* may consist of a block attached to the triangle 38*b* and having an eye for receiving the cable 50*b*, and a screw arrangement for clamping onto a cable 50*b* received within the eye.

A second fixing 54*b*, similar to the fixing 48*b*, is provided on a slider 80, at a position away from the triangle 38*b*. The slider 80 will be described in more detail below.

In this example, the cable 50*b* is the inner cable of a Bowden cable 56*b*. The cable 50*b* is covered by a sheath 58*b*. The sheath is fixed in the eye of the fixing 54*b*. Accordingly, the sheath 58*b* is fixed in position; relative to the slider 80, by the fixing 54*b*. The cable 50*b* is fixed to the triangle 38*b*, by means of the fixing 48*b*. Accordingly, manipulation of the Bowden cable 56*b*, at the end remote from the plates 26*b*, allows the fixing 48*b* to be pulled toward, or released to move away from the fixing 54*b*. As this force is applied or released, the triangle 38*b* is urged to swing about the corner 44*b*, relative to the plate 26*b*, as will be described. Manipulation of the Bowden cable is by means of an over-centre lever arrangement 57.

The Bowden cable 56*b* thus provides a manual arrangement for setting the position of the triangle 38*b*.

The slider 80 has slots 82 at three positions, captive under enlarged slider retaining heads 84. The fixing 54*b* is close to one end of the slider 80, in the vicinity of the gearbox 32*b*. The other end of the slider 80, in the vicinity of the shaft 24*b*, is connected with a carriage structure 86 which is slidably mounted on the plates 26*b* by a mounting indicated at 88. The carriage 86 carries a fixed shaft 90, of which only the extreme end is visible in FIGS. 19 and 20. A toothed member in the form of a toothed wheel 92, and a chain wheel 94, both ride on the shaft 90, and are coupled by a dog coupling at 95, so that they together form a rotatable member which can rotate around the fixed shaft 90.

The wheel 12*b* carries a second toothed wheel 96, which is bolted to the hub of the wheel 12*b*. Accordingly, the wheel 12*b* and the toothed wheel 96 together form a rotatable member.

The mounting 88 allows the carriage structure 86 to slide on the plates 26*b*, toward the toothed wheel 96, or away from the toothed wheel 96. This allows the toothed wheel 92 to mesh with the toothed wheel 96, or move out of mesh. An endless chain 100 (only partly shown) is provided to allow the chain wheel 94 to be turned by hand from a position below the drive arrangement 10*b*. This results in the toothed wheel 92 turning about the shaft 90.

The significance of the action of the Bowden cable 56*b* can now be described. In the condition shown in each of FIGS. 13, 15, 17 and 19, the Bowden cable 56*b* has been released, allowing the cable 50*b* to run through the sheath 58*b*. The fixings 48*b*, 54*b* are free to move away from each other. As they do so, the triangle 38*b* carries the wheel 18*b* generally transversely away from the loop member 16*b*.

In addition, the fixing 54*b* tends to move away from the shaft 24*b*, so that the carriage 86 moves toward the shaft 24*b*, urged by a compression spring 87. This brings the toothed wheels 92, 96 into mesh with each other.

In the alternative position of FIGS. 14, 16, 18 and 20, the Bowden cable 56*b* has been manipulated to pull the fixing 54*b* toward the fixing 48*b*, so that the triangle 38*b* swings in the other direction, moving the wheel 18*b* transversely toward the loop member 16*b*. Simultaneously, the fixing 54*b* moves toward the shaft 24*b*, causing the carriage 86 to move away from the shaft 24*b*, so that the toothed wheels 92, 96 move out of mesh with each other.

Comparison of FIGS. 13 and 14, or FIGS. 15 and 16, or FIGS. 17 and 18, or FIGS. 19 and 20, shows that as the wheel 18*b* moves to the position of FIGS. 14, 16, 18 and 20, the path of the loop member 16*b* is required to deflect, to a greater amount, in order to pass around the wheel 18*b*. The length of the leg of the loop member 16*b*, between the wheel 12*b* and 14*b* and around the wheel 18*b*, is changed by the position of the wheel 18*b*. The change in the length of the path of the loop member 16*b*, caused by movement of the wheel 18*b*, will change the tension in the loop member 16*b* and will thus change how tightly the loop member 16*b* grips around the wheels 12*b*, 14*b*.

In the condition of FIGS. 13, 15, 17 and 19, the wheel 18*b* has moved to a position which results in a relatively short complete path for the loop member 16*b*, which is therefore slack (as clearly visible from the left hand side of FIG. 13). In this condition, the wheels 12*b*, 14*b* are not gripped tightly by the loop member 16*b*. The wheel 14*b* is unable to drive the loop member 16*b* in the event that the motor 36*b* is driving the wheel 14*b*. The wheel 12*b* is not coupled to the wheel 14*b*. The loop member 16*b* is disabled from driving the wheel 12*b* and consequently, the shaft 24*b* cannot be driven by the motor 36*b*.

However, the carriage 86 has moved toward the shaft 24*b*, as noted above, so that the chain 100 can be used manually to turn the chain wheel 94 and hence the toothed wheel 96, now meshed with the toothed wheel 92. Accordingly, the chain 100 provides a manually operable arrangement for turning the shaft 24*b*.

In the alternative position of FIGS. 14, 16, 18 and 20, the overall path length of the loop member 16*b* is longer, by virtue of the position of the wheel 18*b*. This requires the loop member 16*b* to deflect to a greater degree. Accordingly, the loop member 16*b* grips both wheels 12*b*, 14*b* more tightly. This results in driving engagement between the wheel 12*b* and the loop member 16*b* and also between the loop member 16*b* and the wheel 14*b*. In this condition, the motor 36*b* can be used to drive the wheel 14*b*, which is coupled by the tightened loop member 16*b* to drive the wheel 12*b*. Thus the shaft 24*b*, to which the wheel 12*b* is secured, is also driven by the action of the motor 36*b*. This will create torque tending to turn the arrangement 10*b* around the shaft 24*b*. The arrangement 10*b* is braced against this torque by a torque arm 59*b* fixed between the plates 26*b* and a fixed structure (not shown). The force applied between the fixings 48*b*, 54*b*, pulling them together, also results in the carriage 86 being pushed away from the shaft 24*b*, by the action of the slider 80. This takes the toothed wheels 92, 96 out of mesh with each other, thus disabling the chain wheel 94 from turning the shaft 24*b*.

The movement of the wheel 18*b*, to change the overall length of the path of the loop member 16*b*, causes the wheels 12*b*, 14*b* to be engaged or disengaged by the loop member 16*b*, so that the loop member 16*b* will disengageably drive the wheel 12*b* from the wheel 14*b*. The movement of the wheel 18*b* is accompanied with movement of the slider 80, causing the toothed wheels 92, 96 to mesh or unmesh, so that the manual operation by means of the chain 100 becomes enabled as the motor 36*b* is disabled from driving the shaft 24*b*, and the manual operation is disengaged as the motor 36*b* becomes operable for driving the shaft 24*b*. Manipulation of the Bowden cable therefore provides a safety feature, allowing the powered operation of the arrangement 10*b* to be overridden, for manual operation.

Many variations and modifications can be made to the apparatus described above, without departing from the scope of the present invention. For example, many other shapes, sizes and relative shapes and sizes can be considered for the various components of the apparatus described.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A drive arrangement comprising:

first and second rotatable members;

an endless loop member extending around both rotatable members; and a guide member which defines at least part of the path of the loop member;

wherein the guide member is mounted on a pivotally mounted member and is movable to change the length of the path to cause the rotatable members to be engaged or disengaged by the loop member, the loop member serving to disengageably convey drive from one of the rotatable members to the other of the rotatable members when the rotatable members are engaged by the loop member, and further comprising a carriage structure movable relative to one of the rotatable members into and out of driving engagement with the said rotatable member, and wherein the carriage structure carries a toothed member which meshes with a mesh of the rotatable member when the carriage structure and the rotatable member are in driving engagement and a force applied between the pivotally mounted member and the carriage structure causes the pivotally mounted member to cause the guide member to move, the movement of the guide member causing the rotatable members to be engaged by the loop member and the force applied between the pivotally mounted member and the carriage structure causes the carriage structure to carry the toothed member out of mesh with the mesh of the rotatable member so that the rotatable member is disengaged by the toothed member.

2. An arrangement according to claim 1, wherein the guide member is rotatably mounted at an axis which is movable relative to the rotatable members.

3. An arrangement according to claim 2, wherein the guide member is movable generally transverse to the rotation axis thereof, to change the length of the path.

4. An arrangement according to claim 1, further comprising a manual arrangement for setting the position of the guide member.

5. An arrangement according to claim 1, further comprising means for applying force to cause the pivotally mounted member to pivot.

6. An arrangement according to claim 1, wherein the pivotally mounted member is a bell crank having a first arm and a second arm, the arms meeting at an elbow, and the bell crank being pivotally mounted at the elbow and carrying the guide member on a first of the arms, there being means for applying force to the other arm to cause the bell crank to turn.

7. An arrangement according to claim 1, wherein the carriage structure carries a toothed member which meshes with a mesh of the rotatable member when the carriage structure and the rotatable member are in driving engagement.

8. An arrangement according to claim 1, wherein the carriage structure includes manually operable drive means for manually driving the rotatable member when the carriage structure and the rotatable member are in driving engagement.

9. An arrangement according to claim 8, wherein the manually operable drive means comprise a wheel operable to turn by means of an elongate closed loop member, the wheel being coupled with the toothed member of the carriage structure, to cause the rotatable member to be driven when the wheel is turned and the toothed member and the rotatable member are meshed.

10. Apparatus comprising:

a support member which, in use, rotatably supports a driven member relative to a fixed structure;

a drive arrangement according to claim 1, operable to drive the driven member to rotate; and the drive arrangement being mounted, in use, on the fixed structure by means of the support member, and the support member, in use, bracing the drive arrangement against torque generated by driving the driven member.

11. Apparatus according to claim 10, wherein the drive arrangement comprises a common support on which the first and second rotatable members are mounted, and wherein the common support couples, in use, with the support member to support the drive arrangement relative to the fixed structure.

12. Apparatus according to claim 11, wherein the common support releasably couples with the support member.

13. Apparatus according to claim 11, wherein the common support and the support member interfit at least at one position, the interfitting preventing relative rotation around the rotation axis of the rotatable member.

* * * * *